US012659144B2

(12) United States Patent
Orsino et al.

(10) Patent No.: US 12,659,144 B2
(45) Date of Patent: Jun. 16, 2026

(54) GENERATING AN AUTHENTICATION TOKEN

(71) Applicant: Telefonaktiebolaget LM Ericsson (publ), Stockholm (SE)

(72) Inventors: Antonino Orsino, Kirkkonummmi (FI); Prajwol Kumar Nakarmi, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 84 days.

(21) Appl. No.: 18/708,843

(22) PCT Filed: Nov. 3, 2022

(86) PCT No.: PCT/EP2022/080688
§ 371 (c)(1),
(2) Date: May 9, 2024

(87) PCT Pub. No.: WO2023/083691
PCT Pub. Date: May 19, 2023

(65) Prior Publication Data
US 2025/0023719 A1     Jan. 16, 2025

Related U.S. Application Data

(60) Provisional application No. 63/277,825, filed on Nov. 10, 2021.

(51) Int. Cl.
H04L 9/08          (2006.01)
H04L 9/32          (2006.01)
(Continued)

(52) U.S. Cl.
CPC .......... H04L 9/0861 (2013.01); H04L 9/3213 (2013.01); H04W 12/06 (2013.01); H04W 76/19 (2018.02)

(58) Field of Classification Search
CPC .... H04L 9/0861; H04L 9/3213; H04W 12/06; H04W 76/19
See application file for complete search history.

(56) References Cited

U.S. PATENT DOCUMENTS

2011/0269426 A1*  11/2011  Hultin ................... H04W 12/10
                                                        455/411
2015/0281961 A1*  10/2015  Lee ........................ H04W 12/04
                                                        455/411
(Continued)

FOREIGN PATENT DOCUMENTS

WO          2019/178755 A1      9/2019
WO      WO-2020056433 A2 *     3/2020    ........ H04W 36/0038
WO          2021/096411 A1      5/2021

OTHER PUBLICATIONS

International Search Report and Written Opinion issued in International Application No. PCT/EP2022/080688 dated Feb. 23, 2023 (11 pages).
(Continued)

*Primary Examiner* — J. Brant Murphy
(74) *Attorney, Agent, or Firm* — Rothwell, Figg, Ernst & Manbeck, P.C.

(57)          ABSTRACT

Embodiments of the present disclosure includes methods for generating an authentication token. One of the methods comprising obtaining a first request message that comprises: a first field containing a first value, a second field containing a second value, and a third field containing a pre-defined token value; and using the first request message to generate an authentication token.

13 Claims, 8 Drawing Sheets

(51) Int. Cl.
　　　*H04W 12/06*　　　　(2021.01)
　　　*H04W 76/19*　　　　(2018.01)

(56) References Cited

U.S. PATENT DOCUMENTS

| 2016/0269948 | A1* | 9/2016 | Wang | H04W 36/0085 |
| 2019/0007874 | A1* | 1/2019 | Mildh | H04W 76/19 |
| 2020/0323011 | A1* | 10/2020 | Lehtovirta | H04W 76/19 |
| 2020/0337104 | A1* | 10/2020 | Lehtovirta | H04W 12/041 |

OTHER PUBLICATIONS

Menezes, A. et al., Chapter from the Handbook of Applied Cryptography, XP001525009, CRC Press, Inc. 1997 (64 pages).

* cited by examiner

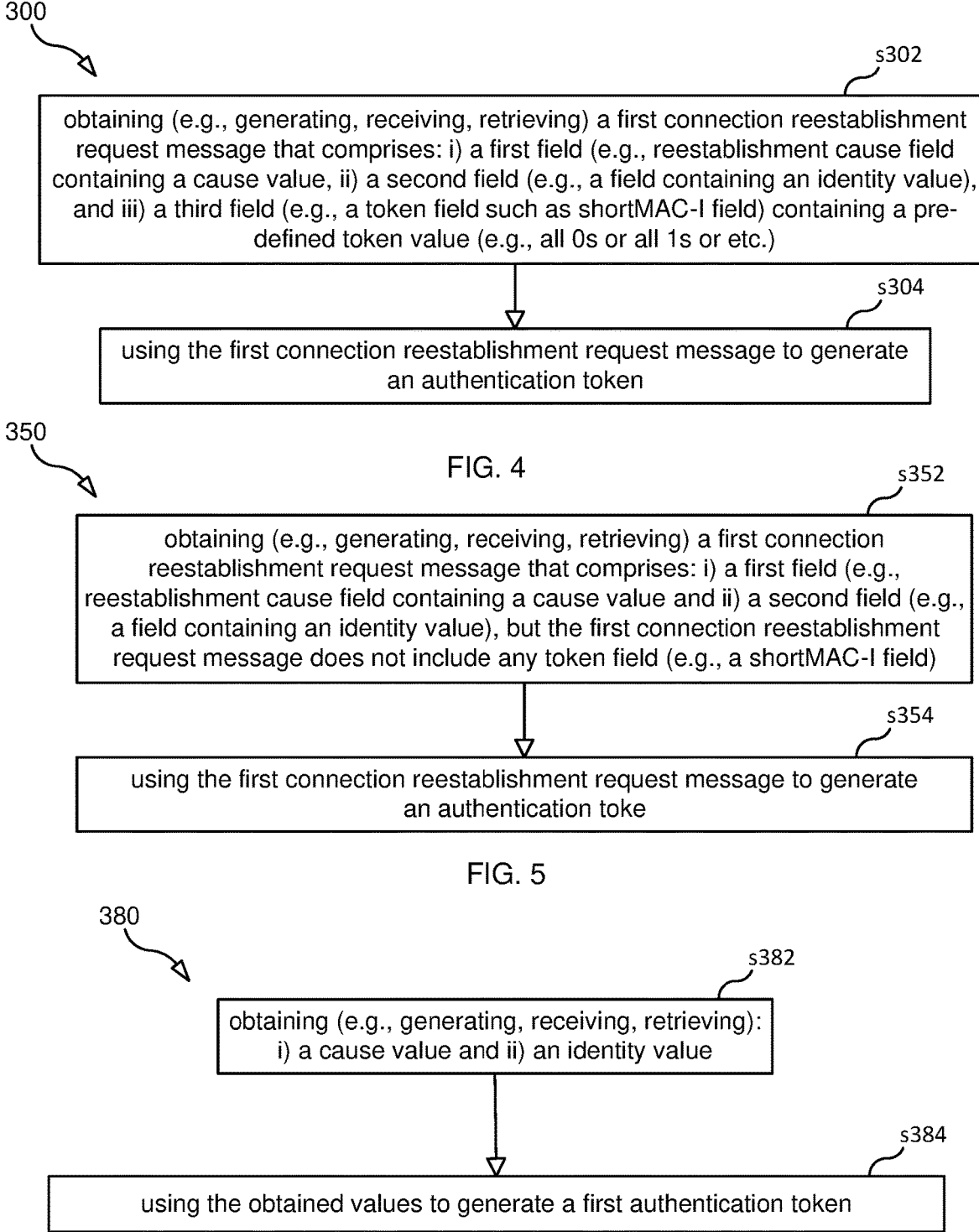

300 s302 obtaining (e.g., generating, receiving, retrieving) a first connection reestablishment request message that comprises: i) a first field (e.g., reestablishment cause field containing a cause value, ii) a second field (e.g., a field containing an identity value), and iii) a third field (e.g., a token field such as shortMAC-I field) containing a pre-defined token value (e.g., all 0s or all 1s or etc.)

s304 using the first connection reestablishment request message to generate an authentication token

FIG. 4

350 s352 obtaining (e.g., generating, receiving, retrieving) a first connection reestablishment request message that comprises: i) a first field (e.g., reestablishment cause field containing a cause value and ii) a second field (e.g., a field containing an identity value), but the first connection reestablishment request message does not include any token field (e.g., a shortMAC-I field)

s354 using the first connection reestablishment request message to generate an authentication toke

FIG. 5

380 s382 obtaining (e.g., generating, receiving, retrieving): i) a cause value and ii) an identity value s384 using the obtained values to generate a first authentication token

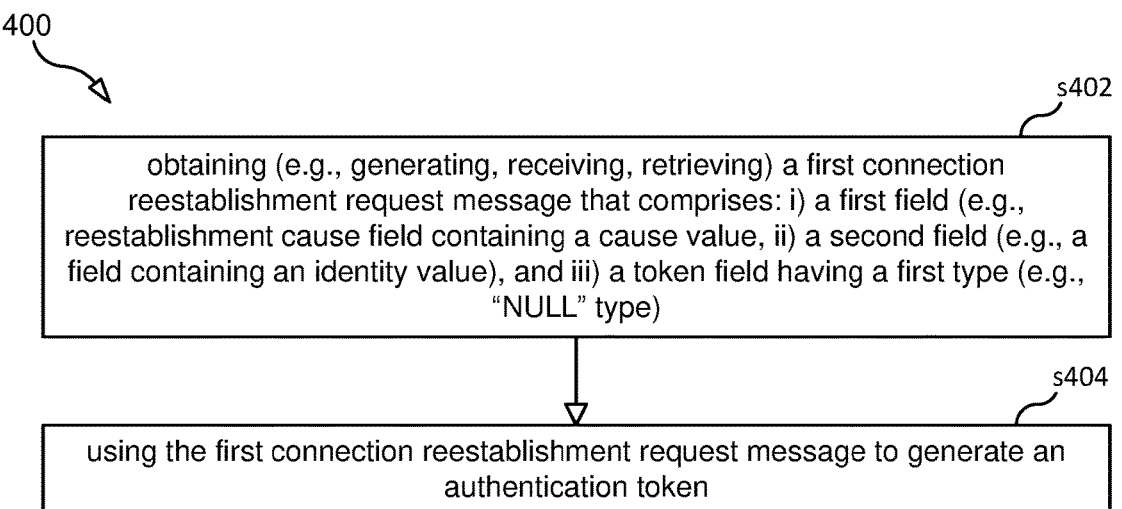

obtaining (e.g., generating, receiving, retrieving) a first connection reestablishment request message that comprises: i) a first field (e.g., reestablishment cause field containing a cause value, ii) a second field (e.g., a field containing an identity value), and iii) a token field having a first type (e.g., "NULL" type)

s404 using the first connection reestablishment request message to generate an authentication token

transmitting information to a user equipment,UE, wherein
i) the information indicates that the network node supports using a first method for generating an authentication token for authenticating a connection reestablishment request message and/or
ii) the information instructs the UE to use the first method to generate the authentication token for authenticating a connection reestablishment request message

receiving information transmitted by a network node of an access network, wherein
i) the information indicates that the network node supports using a first method for generating an authentication token for authenticating a connection reestablishment request message and/or
ii) the information instructs the UE to use the first method to generate the authentication token for authenticating a connection reestablishment request message.

FIG. 9

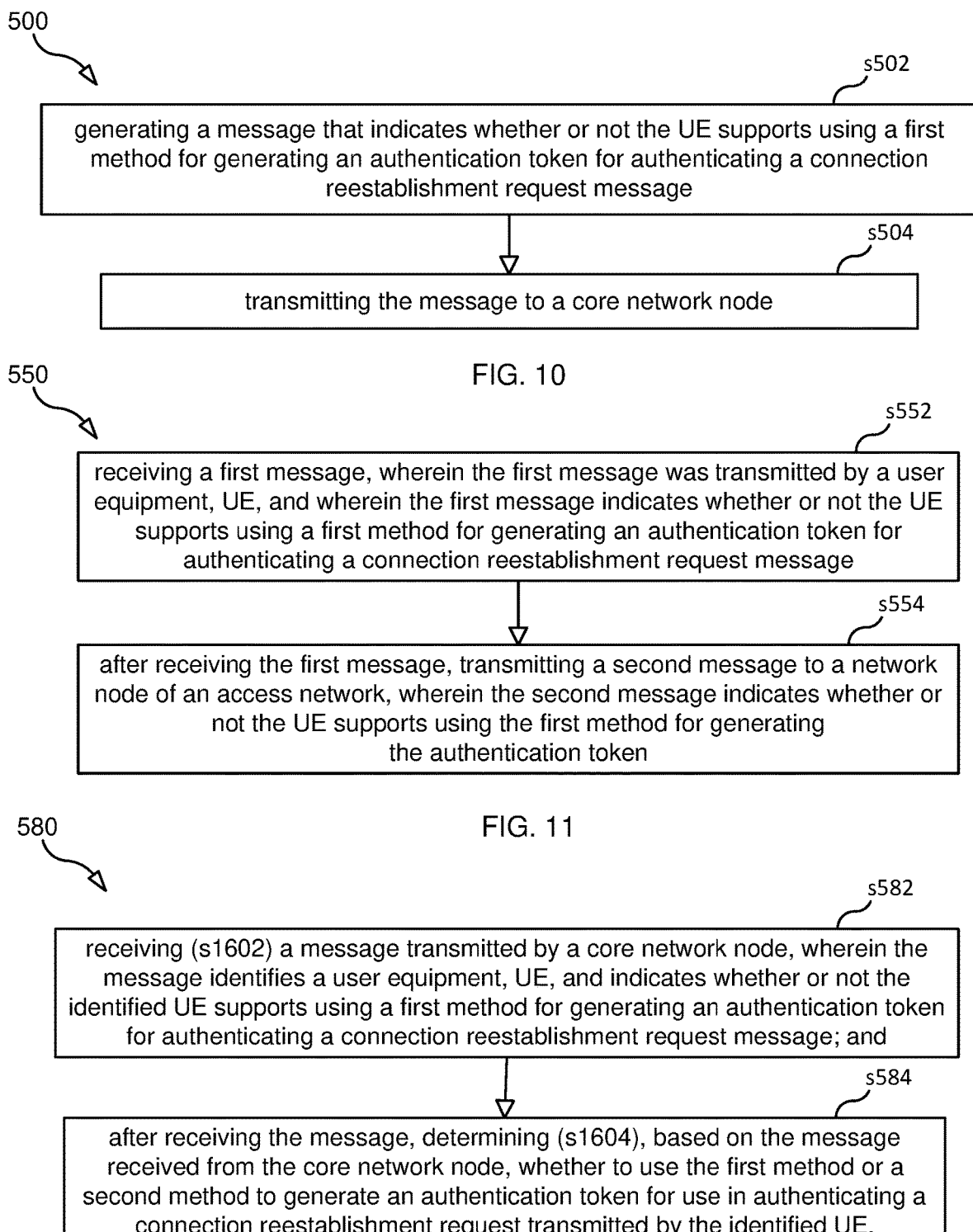

500 s502 generating a message that indicates whether or not the UE supports using a first method for generating an authentication token for authenticating a connection reestablishment request message s504 transmitting the message to a core network node

FIG. 10

550 s552 receiving a first message, wherein the first message was transmitted by a user equipment, UE, and wherein the first message indicates whether or not the UE supports using a first method for generating an authentication token for authenticating a connection reestablishment request message s554 after receiving the first message, transmitting a second message to a network node of an access network, wherein the second message indicates whether or not the UE supports using the first method for generating the authentication token

FIG. 11

580 s582 receiving (s1602) a message transmitted by a core network node, wherein the message identifies a user equipment, UE, and indicates whether or not the identified UE supports using a first method for generating an authentication token for authenticating a connection reestablishment request message; and s584 after receiving the message, determining (s1604), based on the message received from the core network node, whether to use the first method or a second method to generate an authentication token for use in authenticating a connection reestablishment request transmitted by the identified UE.

transmitting to a source network node/network device a message comprising: i) a first connection reestablishment request message that the target received from a user equipment or ii) a second reestablishment request message that the target generated based on the first connection reestablishment request message

FIG. 13

650 s652 generating a first authentication token using a first cause value s654 transmitting to a second network node/network device a message comprising the first authentication token

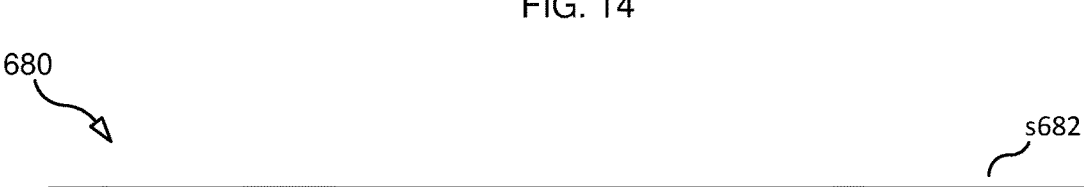

receiving a message transmitted by a second network node/network device, the message comprising a first authentication token generated by the second network node using a first cause value

FIG. 15

UE        Network

*RRCResumeRequest/RRCResumeRequest1* →

← *RRCResume*

*RRCResumeComplete* →    FIG. 18

UE        Network

*RRCResumeRequest/RRCResumeRequest1* →

← *RRCSetup*

*RRCSetupComplete* →    FIG. 19

UE        Network

*RRCResumeRequest/RRCResumeRequest1* →

← *RRCRelease*

FIG. 20

UE        Network

*RRCResumeRequest/RRCResumeRequest1* →

← *RRCRelease with suspend configuration*

FIG. 21

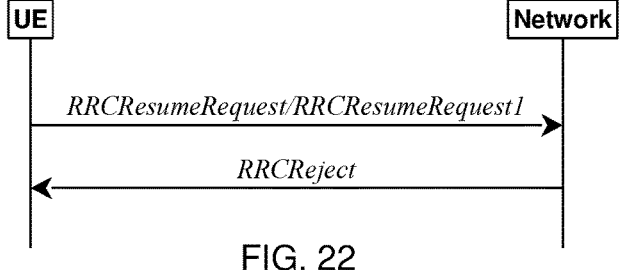

UE        Network

*RRCResumeRequest/RRCResumeRequest1* →

← *RRCReject*

FIG. 22

GENERATING AN AUTHENTICATION TOKEN

CROSS REFERENCE TO RELATED APPLICATIONS

This application is a 35 U.S.C. § 371 National Stage of International Patent Application No. PCT/EP2022/080688, filed 2022 Nov. 3, which claims priority to U.S. Provisional Patent Application No. 63/277,825, filed 2021 Nov. 10. The above identified applications are incorporated by this reference.

TECHNICAL FIELD

This disclosure relates to, among other things, generating an authentication token for a Radio Resource Control (RRC) message, such as the RRCReestablishmentRequest message.

BACKGROUND

RRC Connection Resume

The RRC Connection Resume procedure is used to resume a suspended RRC connection, including resuming one or more Signalling Radio Bearers (SRB(s)) and one or more Data Radio Bearers (DRB(s)) or perform a Radio Access Network Based Notification Area (RNA) update.

As explained in 3GPP TS 38.331 V16.4.1 (hereafter "TS 38.331"), the UE initiates the RRC Connection Resume procedure when upper layers or Access Stratum (AS) (when responding to Radio Access Network (RAN) paging, upon triggering RNA updates while the UE is in RRC_INACTIVE, or for sidelink communication as specified in subclause 5.3.13.1a) request the resume of a suspended RRC connection. FIGS. 11A-11E illustrate different RRC connection resume scenarios.

Message Definition According to TS 38.331

RRCResumeRequest Message

As stated in TS 38.331:

The RRCResumeRequest message is used to request the resumption of a suspended RRC connection or perform an RNA update.

---

Signalling radio bearer: SRB0
RLC-SAP: TM
Logical channel: CCCH
Direction: UE to Network

---

As shown in the Table provided below, the RRCResumeRequest message comprises a sequence of RRC Resume Request Information Elements (IEs).

TABLE

| RRCResumeRequest message | |
|---|---|
| RRCResumeRequest ::= | SEQUENCE { |
| rrcResumeRequest | RRCResumeRequest-IEs |
| } | |
| RRCResumeRequest-IEs ::= | SEQUENCE { |
| resumeIdentity | ShortI-RNTI-Value, |
| resumeMAC-I | BIT STRING (SIZE (16)), |
| resumeCause | ResumeCause, |
| spare | BIT STRING (SIZE (1)) |
| } | |

The resumeCause IE "provides the resume cause for the RRC connection resume request as provided by the upper layers or RRC. The network is not expected to reject an RRCResumeRequest due to unknown cause value being used by the UE."

The resumeIdentity IE is a "UE identity to facilitate UE context retrieval at gNB."

The resumeMAC-I IE is an "authentication token to facilitate UE authentication at gNB. The 16 least significant bits of the MAC-I calculated using the AS security configuration."

RRCResumeRequest1 Message

As stated in TS 38.331:

The RRCResumeRequest1 message is used to request the resumption of a suspended RRC connection or perform an RNA update.

---

Signalling radio bearer: SRB0
RLC-SAP: TM
Logical channel: CCCH1
Direction: UE to Network

---

As shown in the Table provided below, the RRCResumeRequest1 message comprises a sequence of RRC Resume Request1 Information Elements (IEs).

TABLE

| RRCResumeRequest1 message | |
|---|---|
| RRCResumeRequest1 ::= | SEQUENCE { |
| rrcResumeRequest1 | RRCResumeRequest1-IEs |
| } | |
| RRCResumeRequest1-IEs ::= | SEQUENCE { |
| resumeIdentity | I-RNTI-Value, |
| resumeMAC-I | BIT STRING (SIZE (16)), |
| resumeCause | ResumeCause, |
| spare | BIT STRING (SIZE (1)) |
| } | |

The resumeCause IE "[p]rovides the resume cause for the RRCResumeRequest1 as provided by the upper layers or RRC. A gNB is not expected to reject an RRCResumeRequest1 due to unknown cause value being used by the UE."

The resumeIdentity IE is a "UE identity to facilitate UE context retrieval at gNB."

The resumeMAC-I IE is an "[a]uthentication token to facilitate UE authentication at gNB. The 16 least significant bits of the MAC-I calculated using the AS security configuration."

VarResumeMAC-Input

The UE variable VarResumeMAC-Input specifies the input used to generate the resumeMAC-I during RRC connection resume procedure. The table provided below illustrates the information elements that comprise the VarResumeMAC-Input.

TABLE

| VarResumeMAC-Input variable | |
|---|---|
| VarResumeMAC-Input ::= | SEQUENCE { |
| sourcePhysCellId | PhysCellId, |
| targetCellIdentity | CellIdentity, |
| source-c-RNTI | RNTI-Value |
| } | |

The "targetCellIdentity" IE is "[a]n input variable used to calculate the resumeMAC-I. Set to the cellIdentity of the first PLMN-Identity included in the PLMN-IdentityInfoList broadcasted in SIB1 of the target cell i.e. the cell the UE is trying to resume."

The "source-c-RNTI" IE is set to "C-RNTI that the UE had in the PCell it was connected to prior to suspension of the RRC connection."

The "sourcePhysCellId" IE is set to "the physical cell identity of the PCell the UE was connected to prior to suspension of the RRC connection."

SUMMARY

Certain challenges presently exist. For instance, currently the RRCReestablishmentRequest message is not protected against tampering.

The RRCReestablishmentRequest message has a field called ReestablishmentCause which currently has four possible values—reconfigurationFailure, handoverFailure, otherFailure, and spare1. But currently the whole RRCReestablishmentRequest message is not protected by the shortMAC-I token. This means that the ReestablishmentCause field (which may include one or more new values in future) or one or more new fields to be included in the RRCReestablishmentRequest message in the future are prone to tampering by an attacker.

Accordingly, in one aspect there is provided a method for generating an authentication token. The method comprises obtaining (e.g., generating, receiving, retrieving) a first request message (e.g., a connection Reestablishment request message or a connection Resume request message) that comprises: i) a first field containing a first value (e.g., reestablishment cause field containing a cause value, ii) a second field containing a second value (e.g., a field containing an identity value), and iii) a third field (e.g., a token field such as shortMAC-I field) containing a pre-defined token value (e.g., all 0s or all 1s or etc.); and using the first request message to generate an authentication token.

In another aspect, there is provided a method for generating an authentication token. The method comprises obtaining (e.g., generating, receiving, retrieving) a first request message that comprises: i) a first field containing a first value (e.g., reestablishment cause field containing a cause value and ii) a second field containing a second value (e.g., a field containing an identity value), but the first request message does not include any token field (e.g., a shortMAC-I field); and using the first request message to generate an authentication token.

In another aspect, there is provided a method for generating an authentication token. The method comprises obtaining (e.g., generating, receiving, retrieving): i) a cause value and ii) an identity value; and using the obtained values to generate a first authentication token.

In another aspect, there is provided a method for generating an authentication token. The method comprises obtaining (e.g., generating, receiving, retrieving) a first request message that comprises: i) a first field containing a first value (e.g., reestablishment cause field containing a cause value, ii) a second field containing a second value (e.g., a field containing an identity value), and iii) a token field having a first type (e.g., "NULL" type); and using the first request message to generate an authentication token.

In another aspect, there is provided a method performed by network node/network device, e.g. a radio base station, of an access network. The method comprises: transmitting (s452) information to a user equipment, UE, wherein i) the information indicates that the network node supports using a first method for generating an authentication token for authenticating a request message and/or ii) the information instructs the UE to use the first method to generate the authentication token for authenticating a request message.

In another aspect, there is provided a method performed by a user equipment, UE. The method comprises receiving information transmitted by a network node of an access network, wherein i) the information indicates that the network node supports using a first method for generating an authentication token for authenticating a request message and/or ii) the information instructs the UE to use the first method to generate the authentication token for authenticating a request message.

In another aspect, there is provided a method performed by a user equipment, UE. The method comprises generating a message that indicates whether or not the UE supports using a first method for generating an authentication token for authenticating a request message; and transmitting the message to a core network node.

In another aspect, there is provided a method performed by a core network node/core network device. The method comprises receiving a first message, wherein the first message was transmitted by a user equipment, UE, and wherein the first message indicates whether or not the UE supports using a first method for generating an authentication token for authenticating a request message; and after receiving the first message, transmitting a second message to a network node of an access network, wherein the second message indicates whether or not the UE supports using the first method for generating the authentication token.

In another aspect, there is provided a method performed by a network node/network device, e.g. a radio base station, of an access network. The method receiving a message transmitted by a core network node, wherein the message identifies a user equipment, UE, and indicates whether or not the identified UE supports using a first method for generating an authentication token for authenticating a request message. The method further comprises after receiving the message, determining (s584), based on the message received from the core network node, whether to use the first method or a second method to generate an authentication token for use in authenticating a request transmitted by the identified UE.

In another aspect, there is provided a method performed by a target network node/network device. The method comprises transmitting to a source network node/network device a message comprising: i) a first request message that the target received from a user equipment or ii) a second request message that the target generated based on the first request message.

In another aspect, there is provided a method performed by a first network node/network device (e.g. a radio base station) of an access network (e.g., a 3GPP radio access network). The method comprises generating a first authentication token using a first value; and transmitting to a second network node/network device a message comprising the first authentication token.

In another aspect, there is provided a method performed by a first network node/network device (e.g. a radio base station) of an access network. The method comprises receiving a message transmitted by a second network node/network device, the message comprising a first authentication token generated by the second network node using a first value.

In another aspect, there is provided a computer program comprising instructions which when executed by processing circuitry of a user equipment, UE, causes the UE to perform the method of any one of the above described embodiments.

In another aspect, there is provided a computer program comprising instructions which when executed by processing circuitry of a network node, causes the network node to perform the method of any one of the above described embodiments.

In another aspect, there is provided a UE, the UE being configured to perform the method of any one of the above described embodiments.

In another aspect, there is provided a user equipment, UE. The UE comprises memory; and processing circuitry, wherein the UE is configured to perform the method of any one of the above described embodiments.

In another aspect, there is provided a network node, the network node being configured to perform the method of any one of the above described embodiments.

In another aspect, there is provided a network node, the network node comprising: memory; and processing circuitry, wherein the network node is configured to perform the method of any one of the above described embodiments.

An advantage of the embodiments disclosed herein is that they provide robust RRC connection re-establishment procedure so that a network (e.g., a base station) can detect if an attacker has tampered with the RRCReestablishmentRequest message sent by a UE.

BRIEF DESCRIPTION OF THE DRAWINGS

The accompanying drawings, which are incorporated herein and form part of the specification, illustrate various embodiments.

FIG. 4 is a flowchart illustrating a process according to some embodiments.

FIG. 5 is a flowchart illustrating a process according to some embodiments.

FIG. 6 is a flowchart illustrating a process according to some embodiments.

FIG. 7 is a flowchart illustrating a process according to some embodiments.

FIG. 8 is a flowchart illustrating a process according to some embodiments.

FIG. 9 is a flowchart illustrating a process according to some embodiments.

FIG. 10 is a flowchart illustrating a process according to some embodiments.

FIG. 11 is a flowchart illustrating a process according to some embodiments.

FIG. 12 is a flowchart illustrating a process according to some embodiments.

FIG. 13 is a flowchart illustrating a process according to some embodiments.

FIG. 14 is a flowchart illustrating a process according to some embodiments.

FIG. 15 is a flowchart illustrating a process according to some embodiments.

FIG. 18 illustrates signaling in relation to a successful RRC resume.

FIG. 19 illustrates successful RRC connection resume fallback to RRC connection establishment.

FIG. 20 illustrates successful RRC connection resume followed by network release.

FIG. 21 illustrates a successful RRC connection resume followed by network suspend.

FIG. 22 illustrates an RRC connection resume request from the UE followed by a rejection from the network.

DETAILED DESCRIPTION

As described in detail below, in some embodiments of this disclosure, when the target cell gets the RRCReestablishmentRequest message from the UE and if the target cell has a corresponding shortMAC-I (provided by the source cell) for the ReestablishmentCause received from the UE in the RRCReestablishmentRequest message, the target cells checks if the shortMAC-I contained in the RRCReestablishmentRequest message matches the shortMAC-I provided by source cell.

On the other hand, in case the target cell gets the RRCReestablishmentRequest message from the UE but the target cell does not have a corresponding shortMAC-I (provided by the source cell) for the ReestablishmentCause received from the UE in the RRCReestablishmentRequest message, the target cells may perform the context fetch procedure.

Using the above methods, embodiments of this disclosure allow avoiding an attacker (e.g., a MiTM false base station attacks) tampering the RRCReestablishmentRequest message sent by a UE.

The RRC connection re-establishment procedure is described in TS 38.331 v16.6.0, TS 38.300 v 16.6.0, and TS 33.501 v16.6.0.

The embodiments disclosed herein are exemplified in the context of NR, but the embodiments are not limited to NR and can also be applied to Long Term Evolution (LTE), and the use of gNB for a base station could alternatively be said to be an eNodeB (eNB). It is also envisioned that the invention would be applicable also to future networks, such as a future $6^{th}$ generation 3GPP network.

Figure 1:
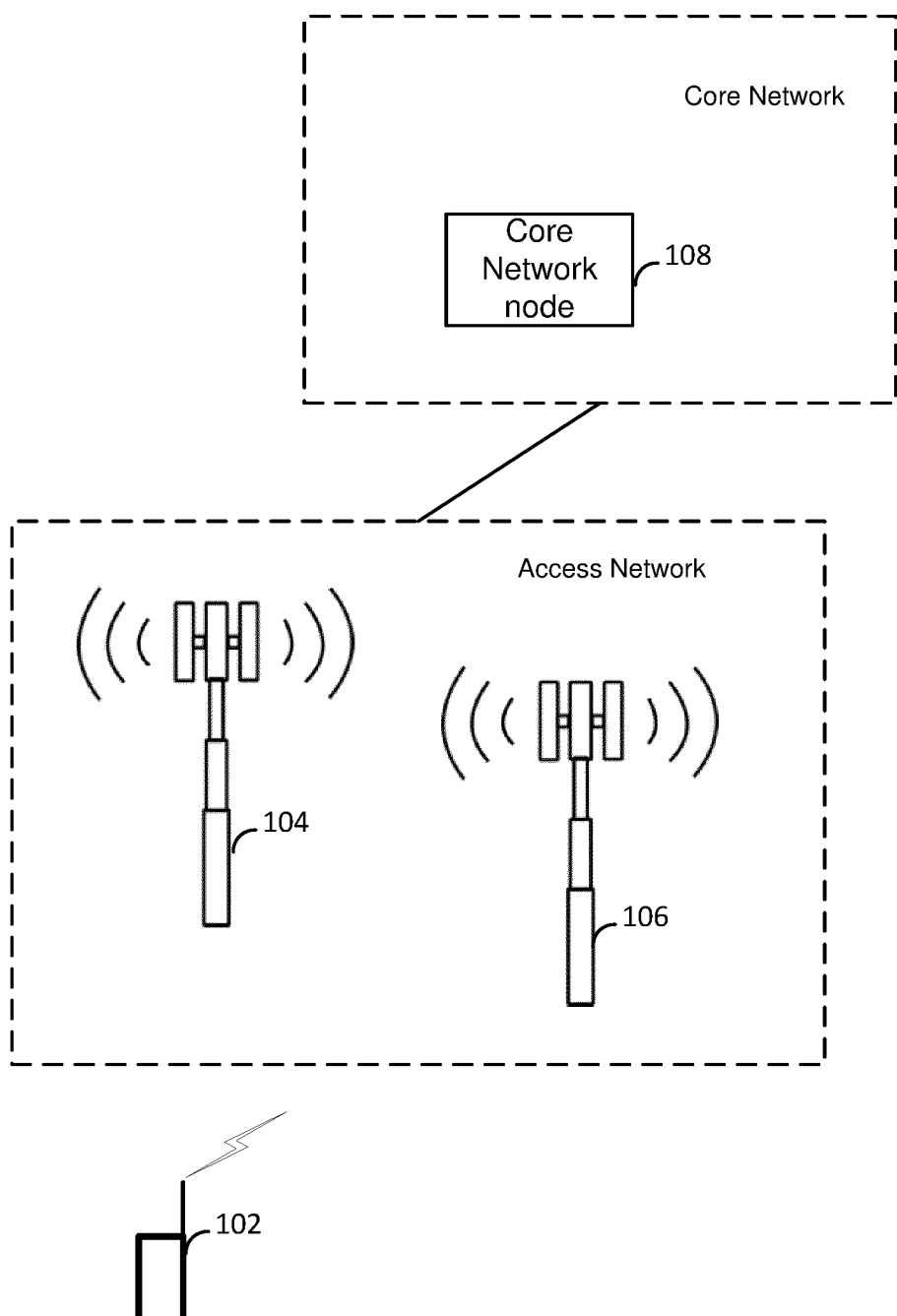
FIG. 1 illustrate a network according to some embodiments.

FIG. 1 illustrates a network 100 comprising a UE 102, a first network node/network device 104 (e.g., a first gNB or eNB), a second network node 106 (e.g., a second gNB or eNB), and a third network node 108 (e.g., an Access and Mobility Function (AMF) or a Mobility Management Entity (MME)). A UE is any communication device capable of communicating with a network node (e.g., a base station) of an access network. Examples of a UE include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device/telematics unit, a connected vehicle itself, etc. A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/ window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot.

In this example, the first and second network nodes 104 and 106 are network nodes of an access network (e.g., a radio access network (RAN)) and the third network node 108 is a network node of a core network. Also, in this example, one of the conditions triggering the RRC Connection Reestablishment procedure occurs. The conditions include a radio link failure, a handover failure, mobility from E-UTRA failure, integrity check failure, an RRC connection reconfiguration failure. Furthermore, at a later point in time, the UE 102 attempts to reestablish the RRC connection with the second network node 106 (a.k.a., "the target network node" or "gNB2") by transmitting a RRCReestablishmentRequest message towards the second network node 106.

In the RRC connection re-establishment procedure, there are the following two modes: Context-fetch mode: In the context-fetch mode, the target cell contacts the source cell and fetches UE's context. In this mode, the source cell can validate the shortMAC-I and therefore, the protection mechanism similar to the RRCResumeRequest protection described in U.S. 63/219,484 and U.S. 62/933,750 will work.

Pre-population mode: In the pre-population mode, the source cell prepares or pre-populates multiple target cells in order to expedite a potential re-establishment procedure. In this mode, the source cell has no chance to validate the shortMAC-I, since the target cells are supposed to validate the shortMAC-I themselves. Therefore, in this mode, the protection mechanism similar to the RRCResumeRequest protection described in U.S. 63/219,484 and U.S. 62/933,750 may not work.

A. How the UE Calculates the New shortMAC-I

In one embodiment, when the UE initiates the RRC re-establishment procedure, the UE generates an RRCReestablishmentRequest message and transmits the RRCReestablishmentRequest message to a gNB (e.g., gNB2 in this example). As described above, to generate the RRCReestablishmentRequest message the UE needs to generate the authentication token (i.e., calculate the shortMAC-I). As further described above, to generate the authentication token the UE uses an integrity protection algorithm (NIA or EIA) in the stored AS security context and the following inputs to the integrity protection algorithm: (1) a KEY: that is set to current KRRCint; (2) a BEARER (all its bits shall be set to 1); (3) a DIRECTION (all its bit shall be set to 1); (4) a COUNT (all its bits shall be set to 1); and (5) VarShortMAC-Input.

In other words, in one embodiment, the UE includes at least part of RRCReestablishmentRequest messages in the UE variable VarShortMAC-Input to calculate the shortMAC-I. In one embodiment, the entire RRCReestablishmentRequest message is included in the UE variable VarShortMAC-Input within a container (i.e., OCTET STRING). Since the RRCReestablishmentRequest messages that are ultimately sent by the UE to the gNB include the shortMAC-I fields, in order to avoid any wrong behavior on the UE and network side on how to fill in these field (before to calculate them), at least one (or a combination) of the following options can be applied.

Option 1

The UE when including the initial RRCReestablishmentRequest messages in a container (i.e., OCTET STRING) in the UE variable VarShortMac-Input, it sets the fields short-MAC-I of the RRCReestablishmentRequest to an initial value, for example, a bit string of zeros or ones or any predefined values. After the fields shortMAC-I are calculated by the UE, then the fields shortMAC-I are set to the calculated value, thereby the initial RRCReestablishmentRequest message is transformed into the final RRCReestablishmentRequest message that is sent to the gNB.

Option 2

The UE when including the initial RRCReestablishmentRequest messages in a container (i.e., OCTET STRING) in the UE variable VarShortMac-Input, the initial RRCReestablishmentRequest message does not include the fields shortMAC-I. This means that the fields shortMAC-I are only included in the final RRCReestablishmentRequest messages after these have been calculated based on the UE variable VarShortMac-Input. This means that the fields shortMAC-I in the RRCReestablishmentRequest message are made optional rather than mandatory. This optionality is to enable ASN.1 compliant encoding for calculation of shortMAC-I. For the final RRCReestablishmentRequest message that UE sends to the network, it will remain mandatory.

Option 3

The fields shortMAC-I within the RRCReestablishmentRequest messages are declared in the specification with two possible types. One type, that is also the current one, is a "bit string," and the other one is "null." Therefore, when the UE sends the RRCReestablishmentRequest messages to the network with the fields shortMAC-I it uses the type "bit string" (as it is now in legacy), but when the UE uses the RRCReestablishmentRequest messages in the UE variable VarShortMAC-Input to calculate the fields shortMAC-I it uses the type "null" for the fields shortMAC-I within the UE variable VarShortMAC-Input.

Accordingly, in one option, the UE initiates the RRC re-establishment procedure and includes all the fields of the RRCReestablishmentRequest messages, except for the fields shortMAC-I, in the UE variable VarShortMAC-Input to calculate the shortMAC-I. This means that a new structure is created in the UE variable VarShortMAC-Input where the fields of the RRCReestablishmentRequest messages, except for the fields shortMAC-I are included.

IMPLEMENTATION EXAMPLES

Example 1) In one example, the VarShortMAC-Input variable is defined as shown in the Table provided below. As discussed above, the UE variable VarShortMAC-Input specifies the input used to generate the shortMAC-I during the RRC connection re-establishment procedure. The RRCRestablishmentRequest is included in the variable VarShortMAC-Input in a container (OCTET STRING) (TS 38.331 v16.6.0).

TABLE

| VarShortMAC-Input variable | | |
| --- | --- | --- |
| VarShortMAC-Input ::= | | SEQUENCE { |
| sourcePhysCellId | | PhysCellId, |
| targetCellIdentity | | CellIdentity, |
| source-c-RNTI | | RNTI-Value |
| } | | |

TABLE-continued

| VarShortMAC-Input variable | |
| --- | --- |
| VarShortMAC-Input-r17 ::=<br>rrcReestablishmentReq<br>} | SEQUENCE {<br>OCTET STRING |

As shown in the table provided above, the UE variable VarShortMAC-Input comprises a sequence of Information Elements (IEs).

The sourcePhysCellId IE indicates "the physical cell identity of the PCell the UE was connected to prior to the reestablishment."

The targetCellIdentity IE indicates "[a]n input variable used to calculate the shortMAC-I. It indicates "the cellIdentity of the first PLMN-Identity in the PLMN-IdentityInfoList broadcasted in SIB1 of the target cell, i.e., the cell the UE is trying to reestablish the connection."

The source-cRNTI IE indicates "C-RNTI that the UE had in the PCell it was connected to prior to the reestablishment."

The rrcReestablishmentReq IE is an input variable that includes the entire RRCReestablishmentRequest message used by the UE to reestablish the RRC connection. The field rrcReestablishmentReq is used to include the RRCReestablishmentRequest message. The UE shall set the field short-MAC-I within rrcReestablishmentReq to a bit string of zeros when including the RRCReestablishmentRequest message.

In this example (and any other embodiments described in this disclosure), the shortMAC-I may be calculated based on any one or a combination of the sourcePhysCellId, target-CellIdentity, source-cRNTI, rrcReestablishmentReq, and reestablishmentCause.

Example 2) In another example, only a set of fields of the RRCReestablishmentRequest is included in the VarShort-MAC-Input variable (TS 38.331 v16.6.0). Another example of the VarShortMAC-Input variable is shown in the table provided below.

TABLE

| VarShortMAC-Input variable | |
| --- | --- |
| VarShortMAC-Input ::=<br>sourcePhysCellId<br>targetCellIdentity<br>source-c-RNTI<br>} | SEQUENCE {<br>PhysCellId,<br>CellIdentity,<br>RNTI-Value |
| VarShortMAC-Input-r17 ::=<br>ue-Identity<br>reestablishmentCause<br>} | SEQUENCE {<br>ReestabUE-Identity,<br>ReestablishmentCause, |

B. UE and Network Capability Indication of the New shortMAC-I Calculation

In one embodiment, the UE indicates to the network whether or not the UE supports the new calculation for the fields shortMAC-I. In order to do so, the UE can use at least one (or a combination) of the following options to indicate to the network that it supports (or not) the new calculation for the fields shortMAC-I.

Option 1:
The UE includes an indication on whether it supports (or not) the new calculation for the fields shortMAC-I within the RRCReestablishmentRequest message. For example, a new field of type BOOLEAN that, if present, indicates the new calculation.

Option 2:
The UE includes an indication on whether it supports (or not) the new calculation for the fields shortMAC-I within the UECapabilityInformation message.

Option 3:
The UE includes an indication on whether it supports (or not) the new calculation for the fields shortMAC-I in a new uplink dedicated RRC message (that is sent to the network via before sending the RRCReestablishmentRequest message).

Option 4:
The UE provides an indication on whether it supports (or not) the new calculation for the fields shortMAC-I to a core network function like the AMF. For example, the UE can provide the indication as UE's network or security capability to AMF in a NAS message (like Registration Request). Then, the AMF provides the UE's indication to the radio access network function like gNB.

In another embodiment, the network indicates to the UE whether it supports (or not) the new calculation for the fields shortMAC-I. In order to do so, the network can use at least one (or a combination) of the following options to indicate to the network that it supports (or not) the new calculation for the fields shortMAC-I:

Option 1:
The network includes an indication on whether it supports (or not) the new calculation for the fields shortMAC-I within a system information block (SIB) that is sent to the UE via broadcast, or via dedicated signalling. A possible SIB candidate on where to include such indication can be the SIB1 but can also be any other SIB(s) that can be received by the UE or a totally new SIB created for this purpose.

Option 2:
The network includes an indication on whether it supports (or not) the new calculation for the fields shortMAC-I within an existing DL RRC dedicated message. Possible candidate DL RRC dedicated message can be the RRCRelease, the RRCReconfiguration, or the DLInformationTransfer.

Option 3:
The network includes an indication on whether it supports (or not) the new calculation for the fields shortMAC-I within a new Medium Access Control Control Element (MAC CE) or a new Downlink Control Indicator (DCI) format.

In one embodiment, the network can use the indication that is sent to the UE to indicate of the support of the new calculation for the fields shortMAC-I as a means to turn on or off this feature. In fact, the network may use this indication to indicate to the UE whether to use the new calculation or the old one.

In another embodiment, the indication sent by the UE or by the network is a one-bit indication where "1" means the support of the new calculation for the fields shortMAC-I and "0" that the new calculation for the fields shortMAC-I is not supported, or vice versa. Further, in another embodiment, the indication sent by the UE or by the network is a Boolean value where "true" means the support of the new calculation for the fields shortMAC-I and "false" that the new calculation for the fields shortMAC-I is not supported, or vice versa. Yet, in another embodiment, the indication is just a field (i.e., the type of the field does not matter) and mere presence of this field means the support of the new calculation for the fields shortMAC-I and the absence of this field means that the new calculation for the fields shortMAC-I is not supported.

IMPLEMENTATION EXAMPLES

Example 1) In one example, the UE may indicate whether it supports new calculation of shortMAC-I using the IE UE-NR-Capability (described in TS 38.331 v16.6.0).

The IE UE-NR-Capability is used to convey the NR UE Radio Access Capability Parameters, see 3GPP TS 38.306. In one embodiment, the UE-NR-Capability information element is defined as shown in the table provided below.

TABLE

| UE-NR-Capability IE |
|---|

```
UE-NR-Capability ::=                      SEQUENCE {
    accessStratumRelease                      AccessStratumRelease,
    pdcp-Parameters                           PDCP-Parameters,
    rlc-Parameters                        RLC-Parameters                                    OPTIONAL,
    mac-Parameters                            MAC-Parameters
OPTIONAL,
    phy-Parameters                            Phy-Parameters,
    rf-Parameters                         RF-Parameters,
    measAndMobParameters                              MeasAndMobParameters
OPTIONAL,
    fdd-Add-UE-NR-Capabilities                        UE-NR-CapabilityAddXDD-Mode
OPTIONAL,
    tdd-Add-UE-NR-Capabilities                        UE-NR-CapabilityAddXDD-Mode
OPTIONAL,
    fr1-Add-UE-NR-Capabilities                        UE-NR-CapabilityAddFRX-Mode
OPTIONAL,
    fr2-Add-UE-NR-Capabilities                        UE-NR-CapabilityAddFRX-Mode
OPTIONAL,
    featureSets                   FeatureSets                                         OPTIONAL,
    featureSetCombinations                    SEQUENCE (SIZE (1..maxFeatureSetCombinations)) OF
FeatureSetCombination                     OPTIONAL,
    lateNonCriticalExtension                  OCTET STRING (CONTAINING UE-NR-Capability-v15c0)
OPTIONAL,
    nonCriticalExtension                  UE-NR-Capability-v1530
OPTIONAL
}
-- Regular non-critical extensions:
UE-NR-Capability-v1530 ::=                            SEQUENCE {
    fdd-Add-UE-NR-Capabilities-v1530                          UE-NR-CapabilityAddXDD-Mode-v1530
OPTIONAL,
    tdd-Add-UE-NR-Capabilities-v1530                          UE-NR-CapabilityAddXDD-Mode-v1530
OPTIONAL,
    dummy                         ENUMERATED {supported}
OPTIONAL,
    interRAT-Parameters                       InterRAT-Parameters
OPTIONAL,
    inactiveState                 ENUMERATED {supported}
OPTIONAL,
    delayBudgetReporting                      ENUMERATED {supported}
OPTIONAL,
    nonCriticalExtension                  UE-NR-Capability-v1540
OPTIONAL
}
UE-NR-Capability-v1540 ::=                        SEQUENCE {
    sdap-Parameters                       SDAP-Parameters
OPTIONAL,
    overheatingInd                ENUMERATED {supported}
OPTIONAL,
    ims-Parameters                        IMS-Parameters                                      OPTIONAL,
    fr1-Add-UE-NR-Capabilities-v1540                      UE-NR-CapabilityAddFRX-Mode-v1540
OPTIONAL,
    fr2-Add-UE-NR-Capabilities-v1540                      UE-NR-CapabilityAddFRX-Mode-v1540
OPTIONAL,
    fr1-fr2-Add-UE-NR-Capabilities                    UE-NR-CapabilityAddFRX-Mode
OPTIONAL,
    nonCriticalExtension                  UE-NR-Capability-v1550
OPTIONAL
}
UE-NR-Capability-v1550 ::=                        SEQUENCE {
    reducedCP-Latency                     ENUMERATED {supported}
OPTIONAL,
    nonCriticalExtension                  UE-NR-Capability-v1560
OPTIONAL
}
UE-NR-Capability-v1560 ::=                        SEQUENCE {
    nrdc-Parameters                       NRDC-Parameters
OPTIONAL,
    receivedFilters                       OCTET STRING (CONTAINING UECapabilityEnquiry-
v1560-IEs)  OPTIONAL,
    nonCriticalExtension                  UE-NR-Capability-v1570
OPTIONAL
}
UE-NR-Capability-v1570 ::=                        SEQUENCE {
    nrdc-Parameters-v1570                     NRDC-Parameters-v1570
OPTIONAL,
    nonCriticalExtension                  UE-NR-Capability-v1610
OPTIONAL
}
```

TABLE-continued

UE-NR-Capability IE

```
-- Late non-critical extensions:
UE-NR-Capability-v15c0 ::=                              SEQUENCE {
nrdc-Parameters-v15c0                                  NRDC-Parameters-v15c0
OPTIONAL,
partialFR2-FallbackRX-Req                                     ENUMERATED {true}
OPTIONAL,
nonCriticalExtension                          SEQUENCE { }
OPTIONAL
}
-- Regular non-critical extensions:
UE-NR-Capability-v1610 ::=                             SEQUENCE {
    inDeviceCoexInd-r16                       ENUMERATED {supported}
OPTIONAL,
    dl-DedicatedMessageSegmentation-r16                  ENUMERATED {supported}
OPTIONAL,
    nrdc-Parameters-v1610                     NRDC-Parameters-v1610
OPTIONAL,
    powSav-Parameters-r16                         PowSav-Parameters-r16
OPTIONAL,
    fr1-Add-UE-NR-Capabilities-v1610                         UE-NR-CapabilityAddFRX-Mode-v1610
OPTIONAL,
fr2-Add-UE-NR-Capabilities-v1610                          UE-NR-CapabilityAddFRX-Mode-v1610
OPTIONAL,
    bh-RLF-Indication-r16                      ENUMERATED {supported}
OPTIONAL,
    directSN-AdditionFirstRRC-IAB-r16                  ENUMERATED {supported}
OPTIONAL,
    bap-Parameters-r16                     BAP-Parameters-r16
OPTIONAL,
    referenceTimeProvision-r16                      ENUMERATED {supported}
OPTIONAL,
    sidelinkParameters-r16                    SidelinkParameters-r16
OPTIONAL,
    highSpeedParameters-r16                       HighSpeedParameters-r16
OPTIONAL,
    mac-Parameters-v1610                      MAC-Parameters-v1610
OPTIONAL,
    mcgRLF-RecoveryViaSCG-r16                          ENUMERATED {supported}
OPTIONAL,
    resumeWithStoredMCG-SCells-r16                        ENUMERATED {supported}
OPTIONAL,
    resumeWithStoredSCG-r16                        ENUMERATED {supported}
OPTIONAL,
    resumeWithSCG-Config-r16                      ENUMERATED {supported}
OPTIONAL,
    ue-BasedPerfMeas-Parameters-r16                       UE-BasedPerfMeas-Parameters-r16
OPTIONAL,
    son-Parameters-r16                    SON-Parameters-r16
OPTIONAL,
    onDemandSIB-Connected-r16                         ENUMERATED {supported}
OPTIONAL,
    nonCriticalExtension                  UE-NR-Capability-v1640
OPTIONAL
}
UE-NR-Capability-v1640 ::=                             SEQUENCE {
    redirectAtResumeByNAS-r16                          ENUMERATED {supported}
OPTIONAL,
    phy-ParametersSharedSpectrumChAccess-r16 Phy-ParametersSharedSpectrumChAccess-
r16   OPTIONAL,
    nonCriticalExtension                  UE-NR-Capability-v17xy
OPTIONAL
}
UE-NR-Capability-v17xy ::=                             SEQUENCE {
    newCalcShortMAC-I-r17                     ENUMERATED {supported}
OPTIONAL,
    nonCriticalExtension                  SEQUENCE { }
OPTIONAL
}
UE-NR-CapabilityAddXDD-Mode ::=                              SEQUENCE {
    phy-ParametersXDD-Diff                    Phy-ParametersXDD-Diff
OPTIONAL,
    mac-ParametersXDD-Diff                     MAC-ParametersXDD-Diff
OPTIONAL,
    measAndMobParametersXDD-Diff                       MeasAndMobParametersXDD-Diff
OPTIONAL
}
```

TABLE-continued

| UE-NR-Capability IE | |
| --- | --- |
| UE-NR-CapabilityAddXDD-Mode-v1530 ::= | SEQUENCE { |
|   eutra-ParametersXDD-Diff | EUTRA-ParametersXDD-Diff |
| } | |
| UE-NR-CapabilityAddFRX-Mode ::= | SEQUENCE { |
|   phy-ParametersFRX-Diff | Phy-ParametersFRX-Diff |
| OPTIONAL, | |
|   measAndMobParametersFRX-Diff | MeasAndMobParametersFRX-Diff |
| OPTIONAL | |
| } | |
| UE-NR-CapabilityAddFRX-Mode-v1540 ::= SEQUENCE { | |
|   ims-ParametersFRX-Diff | IMS-ParametersFRX-Diff |
| OPTIONAL | |
| } | |
| UE-NR-CapabilityAddFRX-Mode-v1610 ::= SEQUENCE { | |
|   powSav-ParametersFRX-Diff-r16 | PowSav-ParametersFRX-Diff-r16 |
| OPTIONAL, | |
|   mac-ParametersFRX-Diff-r16 | MAC-ParametersFRX-Diff-r16 |
| OPTIONAL | |
| } | |
| BAP-Parameters-r16 ::= | SEQUENCE { |
|   flowControlBH-RLC-ChannelBased-r16 | ENUMERATED {supported} |
| OPTIONAL, | |
|   flowControlRouting-ID-Based-r16 | ENUMERATED {supported} |
| OPTIONAL | |
| } | |

Comparing the definition shown in the table provided above to the current definition in 3GPP TS 38.306, one will see that the "nonCriticalExtension" is in a UE-NR-Capability-v17xy IE, which contains a newCalcShortMAC-I-r17 which is used to indicate whether or not the UE supports the new calculation feature.

Example 2: In another example, the network (e.g., gNB) may use SIB1 (described in TS 38.331 v16.6.0) to indicates support for new calculation of shortMAC-I as capability.

SIB1, which is transmitted by a gNB on the Broadcast Control Channel (BCCH) contains information relevant when evaluating if a UE is allowed to access a cell and defines the scheduling of other system information. It also contains radio resource configuration information that is common for all UEs and barring information applied to the unified access control.

In one embodiment, SIB1 is defined as shown in the table provided below.

TABLE

| SIB1 | | | |
| --- | --- | --- | --- |
| SIB1 ::=   SEQUENCE { | | | |
|   cellSelectionInfo | SEQUENCE { | | |
|     q-RxLevMin | Q-RxLevMin, | | |
|     q-RxLevMinOffset | INTEGER (1..8) | | |
| OPTIONAL,   -- Need S | | | |
|     q-RxLevMinSUL | Q-RxLevMin | | OPTIONAL, |
| -- Need R | | | |
|     q-QualMin | Q-QualMin | | OPTIONAL, -- |
| Need S | | | |
|     q-QualMinOffset | INTEGER (1..8) | | OPTIONAL |
| -- Need S | | | |
|     } | | OPTIONAL,   -- Cond | |
| Standalone | | | |
|   cellAccessRelatedInfo | CellAccessRelatedInfo, | | |
|   connEstFailureControl | ConnEstFailureControl | | |
| OPTIONAL,   -- Need R | | | |
|   si-SchedulingInfo | SI-SchedulingInfo | | OPTIONAL, |
| -- Need R | | | |
|   servingCellConfigCommon | ServingCellConfigCommonSIB | | |
| OPTIONAL,   -- Need R | | | |
|   ims-Emergency Support | ENUMERATED {true} | | |
| OPTIONAL,   -- Need R | | | |
|   eCallOverIMS-Support | ENUMERATED {true} | | |
| OPTIONAL,   -- Need R | | | |
|   ue-TimersAndConstants | | | |
| OPTIONAL,   -- Need R | UE-TimersAndConstants | | |
|   uac-BarringInfo | SEQUENCE { | | |
|     uac-BarringForCommon | UAC-BarringPerCatList | | |
| OPTIONAL,   -- Need S | | | |
|     uac-BarringPerPLMN-List | UAC-BarringPerPLMN-List | | |

TABLE-continued

| SIB1 |
|---|

```
OPTIONAL,   -- Need S
    uac-BarringInfoSetList                     UAC-BarringInfoSetList,
    uac-AccessCategory1-Selection AssistanceInfo CHOICE {
        plmnCommon                             UAC-AccessCategory1-SelectionAssistanceInfo,
        individualPLMNList                         SEQUENCE (SIZE (2..maxPLMN)) OF UAC-
AccessCategory1-SelectionAssistanceInfo
        }                                                          OPTIONAL   -- Need S
    }                                                              OPTIONAL,   -- Need R
    useFullResumeID                      ENUMERATED {true}
OPTIONAL,   -- Need R
    lateNonCriticalExtension                 OCTET STRING
OPTIONAL,
    nonCriticalExtension                     SIB1-v1610-IEs                           OPTIONAL
}
SIB1-v1610-IEs ::=                   SEQUENCE {
    idleModeMeasurementsEUTRA-r16                    ENUMERATED{true}
OPTIONAL,   -- Need R
    idleModeMeasurementsNR-r16                   ENUMERATED{true}
OPTIONAL,   -- Need R
    posSI-SchedulingInfo-r16                 PosSI-SchedulingInfo-r16
OPTIONAL,   -- Need R
    nonCriticalExtension                 SIB1-v1630-IEs                           OPTIONAL
}
SIB1-v1630-IEs ::=                   SEQUENCE {
    uac-BarringInfo-v1630                 SEQUENCE {
        uac-AC1-SelectAssistInfo-r16                 SEQUENCE (SIZE (2..maxPLMN)) OF UAC-AC1-
SelectAssistInfo-r16
    }                                                          OPTIONAL,   -- Need R
    nonCriticalExtension                 SIB1-v17xy-IEs
OPTIONAL
}
SIB1-v17xy-IEs ::=                   SEQUENCE {
    newCalcShortMAC-I-r17                    ENUMERATED {true} OPTIONAL,   -- Need R
    nonCriticalExtension                 SEQUENCE { }
OPTIONAL
}
UAC-AccessCategory 1-SelectionAssistanceInfo ::=         ENUMERATED {a, b, c}
UAC-AC1-SelectAssistInfo-r16 ::=              ENUMERATED {a, b, c, notConfigured}
```

Comparing the definition shown in the table provided above to the current SIB1 definition, one will see that the "nonCriticalExtension" is in a SIB1-v17xy-IEs, which contains a newCalcShortMAC-I-r17 IE which is used to indicate whether or not the cell supports the new calculation for the shortMAC-I according also to the fields included in the RRCReestablishmentRequest message. The table below provides the SIB1 field description.

| SIB1 field descriptions |
|---|
| cellSelectionInfo |
| Parameters for cell selection related to the serving cell. |
| eCallOverIMS-Support |
| Indicates whether the cell supports eCall over IMS services as defined in TS 23.501 [32]. If absent, eCall over IMS is not supported by the network in the cell. |
| idleModeMeasurements EUTRA |
| This field indicates that a UE that is configured for EUTRA idle/inactive measurements shall perform the measurements while camping in this cell and report availability of these measurements when establishing or resuming a connection in this cell. If absent, a UE is not required to perform EUTRA idle/inactive measurements. |
| idleModeMeasurementsNR |
| This field indicates that a UE that is configured for NR idle/inactive measurements shall perform the measurements while camping in this cell and report availability of these measurements when establishing or resuming a connection in this cell. If absent, a UE is not required to perform NR idle/inactive measurements. |
| ims-Emergency Support |
| Indicates whether the cell supports IMS emergency bearer services for UEs in limited service mode. If absent, IMS emergency call is not supported by the network in the cell for UEs in limited service mode. |
| newCalcShortMAC-I |
| Indicates whether the cell support the new calculation for the shortMAC-I according also to the fields included in the RRCReestablishmentRequest message. |

-continued

| SIB1 field descriptions |
|---|
| q-QualMin |

Parameter "$Q_{qualmin}$" in TS 38.304 [20], applicable for serving cell. If the field is absent, the UE applies the (default) value of negative infinity for $Q_{qualmin}$.

| q-QualMinOffset |
|---|

Parameter "$Q_{qualminoffset}$" in TS 38.304 [20]. Actual value $Q_{qualminoffset}$ = field value [dB]. If the field is absent, the UE applies the (default) value of 0 dB for $Q_{qualminoffset}$. Affects the minimum required quality level in the cell.

| q-RxLevMin |
|---|

Parameter "$Q_{rxlevmin}$" in TS 38.304 [20], applicable for serving cell.

| q-RxLevMinOffset |
|---|

Parameter "$Q_{rxlevminoffset}$" in TS 38.304 [20]. Actual value $Q_{rxlevminoffset}$ = field value * 2 [dB]. If absent, the UE applies the (default) value of 0 dB for $Q_{rxlevminoffset}$. Affects the minimum required Rx level in the cell.

| q-RxLevMinSUL |
|---|

Parameter "$Q_{rxlevmin}$" in TS 38.304 [20], applicable for serving cell.

| servingCellConfigCommon |
|---|

Configuration of the serving cell.

| uac-AccessCategory1-SelectionAssistanceInfo |
|---|

Information used to determine whether Access Category 1 applies to the UE, as defined in TS 22.261 [25]. If plmnCommon is chosen, the UAC-AccessCategory1-SelectionAssistanceInfo is applicable to all the PLMNs in plmn-IdentityList. If individualPLMNList is chosen, the 1st entry in the list corresponds to the first PLMN in plmn-IdentityList, the 2nd entry in the list corresponds to the second PLMN in plmn-IdentityList and so on. If uac-AC1-SelectAssistInfo-r16 is present, the UE shall ignore the uac-AccessCategory1-SelectionAssistanceInfo.

| uac-AC1-SelectAssistInfo |
|---|

Information used to determine whether Access Category 1 applies to the UE, as defined in TS 22.261 [25]. The 1st entry in the list corresponds to the first PLMN in plmn-IdentityList, the 2nd entry in the list corresponds to the second PLMN in plmn-IdentityList and so on. Value notConfigured indicates that Access Category 1 is not configured for the corresponding PLMN.

| uac-Barring ForCommon |
|---|

Common access control parameters for each access category. Common values are used for all PLMNs, unless overwritten by the PLMN specific configuration provided in uac-BarringPerPLMN-List. The parameters are specified by providing an index to the set of configurations (uac-BarringInfoSetList). UE behaviour upon absence of this field is specified in clause 5.3.14.2.

| ue-TimersAndConstants |
|---|

Timer and constant values to be used by the UE. The cell operating as PCell always provides this field.

| useFullResumeID |
|---|

Indicates which resume identifier and Resume request message should be used. UE uses fullI-RNTI and RRCResumeRequest1 if the field is present, or shortI-RNTI and RRCResumeRequest if the field is absent.

| Conditional Presence | Explanation |
|---|---|
| Standalone | The field is mandatory present in a cell that supports standalone operation, otherwise it is absent. |

C. Inter-gNB Capability Indication of the New shortMAC-I Calculation

In one embodiment, if the UE tries to re-establish a RRC connection with a gNB (i.e., the target gNB), then the target gNB, when triggering the Retrieve UE Context Request procedure, includes in the Retrieve UE Context request message i) a support indication indicating the support (or not) of the new calculation for the fields shortMAC-I and ii) all the fields included in the VarShortMAC-Input.

Accordingly, the source gNB may determine whether the target gNB supports (or does not support) the new calculation for the shortMAC-I either from the support indication itself or just by the presence of all the fields included in the VarShortMAC-Input. Further, how the target gNB includes all the fields of the VarShortMAC-Input can be by means of a container (i.e., OCTET STRING) where all the fields of the VarShortMAC-Input is included. Otherwise, another solution would be for the target gNB to include the fields one-by-one in different fields.

In another embodiment, such indication from the target gNB to the source gNB is included in a new or existing X2/Xn signalling/message or, as an alternative, such indication is included in a new existing inter-node RRC message.

In one embodiment, if the source gNB receives no indication from the target gNB that the target gNB supports the new calculation for the fields shortMAC-I, the source gNB uses the old/legacy calculation to validate the shortMAC-I of the UE. Further, if the source gNB receives the indication from the target gNB that the target gNB supports the new calculation to calculate and validate the fields shortMAC-I, the source gNB uses the new calculation to calculate and validate the shortMAC-I of the UE.

IMPLEMENTATION EXAMPLES

The target gNB in some embodiments may indicate support for new calculation for the shortMAC-I to the source gNB using a Failure Indication message.

This message is sent by the new NG-RAN node to indicate an RRC re-establishment attempt or a reception of an RLF Report from a UE that suffered a connection failure at the old NG-RAN node.

The table provided below shows a list of IEs included in the message.

| IE/Group Name | Presence | Range | IE type and reference |
|---|---|---|---|
| Message Type | M | | 9.2.3.1 |
| CHOICE Initiating condition | M | | |
| >RRC Reestab | | | |
| >>CHOICE RRC Reestab Initiated Reporting | M | | |
| >>>RRC Reestab Reporting without RLF Report | | | |
| >>>>Failure cell PCI | M | | 9.2.2.10 |
| >>>>Re-establishment cell CGI | M | | Global NG-RAN Cell Identity 9.2.2.27 |
| >>>>C-RNTI | M | | BIT STRING (SIZE (16)) |
| >>>>ShortMAC-I | M | 1 ..<maxnoofReestalbishmentCauses > | BIT STRING (SIZE (16)) |
| >>>RRC Reestab Reporting with RLF Report | | | |
| >>>>UE RLF Report Container | M | | 9.2.2.59 |
| >>>RRC Reestab Reporting with new shortMAC-I | | | |
| >>>>New calculation ShortMAC-I | M | | ENUMERATED (true, ...) |
| >>>>Paramenter for calculation of new short MAC-I | M | 1 ..< maxnoofReestalbishmentCauses > | OCTET STRING |
| >RRC Setup | | | |
| >>CHOICE RRC Setup Initiated Reporting | M | | |
| >>>RRC Setup Reporting with RLF Report | | | |
| >>>>UERLF Report Container | M | | 9.2.2.59 |

| IE/Group Name | Semantics description | Criticality | Assigned Criticality |
|---|---|---|---|
| Message Type | | YES | ignore |
| CHOICE Initiating condition | | YES | reject |
| >RRC Reestab | | | |
| >>CHOICE RRC Reestab Initiated Reporting | | — | |
| >>>RRC Reestab Reporting without RLF Report | | | |
| >>>>Failure cell PCI | Physical Cell Identifier | — | |
| >>>>Re-establishment cell CGI | | — | |
| >>>>C-RNTI | C-RNTI contained in the RRCRe-establishment Request message (TS 38.331 [10]) or in the RRCConnectionReestablishmentRequest message (TS 36.331 [14]) | — | |
| >>>>ShortMAC-I | ShortMAC-I contained in the RRCRe-establishment Request message (TS 38.331 [10]) or in the RRCConnectionReestablishmentRequest message (TS 36.331 [14]). When including the RRCConnectionReestablishmentRequest message, the value of the field reestablishmentCause should be different for each of the element of this list. | | |
| >>>RRC Reestab Reporting with RLF Report | | | |
| >>>>UE RLF Report Container | nr-RLF-Report-r16 IE contained in the UEInformationResponse message (TS 38.331 [10]) or RLF-Report-r9 IE contained in the UEInformationResponse message (TS 36.331 [14]) | — | |
| >>>RRC Reestab Reporting with new shortMAC-I | | | |
| >>>>New calculation ShortMAC-I | Indicates whether the cell support the new calculation for the shortMAC-I according also to the fields included in the RRCReestablishmentRequest message. | — | |
| >>>>Paramenter for calculation of new short MAC-I | Include the RRCReestablishmentRequest message provided by the UE, as defined in TS 38.331. When including the RRCConnectionReestablishmentRequest message, the value of the field | — | |

US 12,659,144 B2

23                                                                                                24

-continued

|  |  |  |
|---|---|---|
|  | reestablishmentCause should be different for each of the element of this list. |  |
| >RRC Setup |  |  |
| >>CHOICE RRC Setup Initiated Reporting |  | — |
| >>>RRC Setup Reporting with RLF Report |  |  |
| >>>>UERLF Report Container | nr-RLF-Report-r16 IE contained in the UEInformationResponse message (TS 38.331 [10]) or RLF-Report-r9 IE contained in the UEInformationResponse message (TS 36.331 [14]) | — |

D. Inter-gNB Pre-Population of Security Context

When the source cell (i.e., a network entity belonging to the source cell) decides to instruct the UE to try a handover to a first target cell, depending on the implemented policy, the source cell may decide to prepare or pre-populate multiple target cells for RRC connection re-establishment, just in case the handover to the first target cell fails due to radio link failures.

As discussed above, in this pre-population mode of the RRC connection re-establishment procedure, because the source cell prepares or pre-populates multiple target cells in order to expedite a potential re-establishment procedure, the source cell has no chance to validate the shortMAC-I.

During the preparation or the pre-population, the source cell may determine if the UE supports the new way of calculating the shortMAC-I and which target cells support the new way of calculating the shortMAC-I. For those target cells that support the new way of calculating the shortMAC-I, the source cell may generate and send two or more security tokens.

Figure 2:
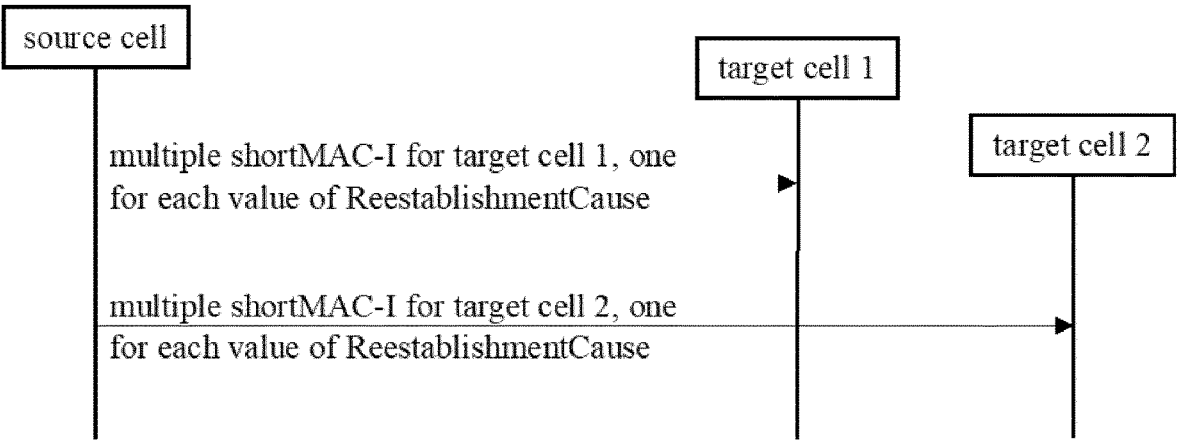
FIG. 2 is a message flow diagram according to some embodiments.

Thus, in one embodiment (shown in FIG. 2), the source cell calculates and provides multiple security tokens, i.e., shortMAC-I, to each target cells. The sets/lists of short-MAC-I for different cells are different. Each of these short-MAC-I is calculated using one of possible values of the ReestablishmentCause field. The source cell can also indicate to the target cells which shortMAC-I belongs to which value of the ReestablishmentCause field.

The IE ReestablishmentCause that contains the Reestablishment Cause field is used to indicate the reason for an attempt at connection reestablishment. The table below illustrates an example of the IE ReestablishmentCause.

```
ReestablishmentCause ::= ENUMERATED {
    reconfigurationFailure,
    handoverFailure, otherFailure,
    spare
```

The ReestablishmentCause field indicates "the failure cause that triggered the re-establishment procedure."

In one embodiment, for each target cell, the source cell may calculate four values of shortMAC-I using the four values of the ReestablishmentCause field—i.e., reconfigurationFailure, handoverFailure, otherFailure, and spare1.

The source cell may also calculate at least two values of shortMAC-I by guessing the two most probable values of the ReestablishmentCause field, e.g., reconfigurationFailure and handoverFailure. This guess may be based on historical information of which values are mostly observed in real world. The guess may also be based on some policy.

Figure 3:
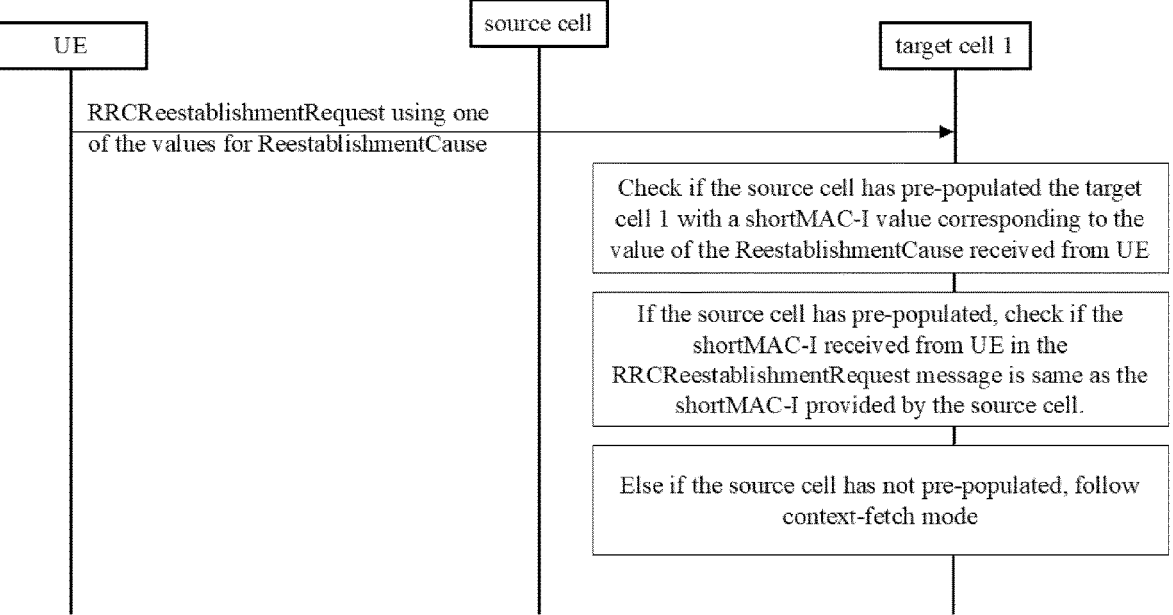
FIG. 3 is a message flow diagram according to some embodiments.

In case the UE chooses another ReestablishmentCause value than the guessed two values, then the target cell may not be able to validate the shortMAC-I, in which case the context-fetch mode (described earlier) may have to be used by the target cell as a fallback approach, as illustrated in FIG. 3.

Alternatively, the source cell may calculate the short-MAC-I by excluding (i.e., not using) the actual value of the ReestablishmentCause field but instead by using a default value when the IE ReestablishmentCause is used for the shortMAC-I calculation. For instance, when calculating the shortMAC-I, the source cell may use a default value for the ReestablishmentCause field as "general", "other", "failure" or any other value that may describe a general failure without going into much details on what the failure was.

In other words, a common value may be assigned to all of different failure causes and such common value may be used for calculating the shortMAC-I calculation. In case the source cell uses a default value for the shortMAC-I calculation, the UE may signal the actual value of the ReestablishmentCause field in a separate message to the source cell which forwards the value to the target cell or, as an alternative, the target cell may get this value directly from the UE.

Whether a default value is used for the ReestablishmentCause field and what the default value is (which is used for the calculation of the shortMAC-I) can be hardcoded in the spec or can be decided by OAM.

FIG. 4 shows a process 300 for generating an authentication token according to some embodiments. The process 300 may be performed by a UE or a network node/network device (e.g. a radio base station) of an access network. The process 300 may begin with step s302. Step s302 comprises obtaining (e.g., generating, receiving, retrieving) a first request message (e.g., a connection Reestablishment request message or a connection Resume request message) that comprises: i) a first field containing a first value (e.g., reestablishment cause field containing a cause value, ii) a second field containing a second value (e.g., a field containing an identity value), and iii) a third field (e.g., a token field such as shortMAC-I field) containing a pre-defined token value (e.g., all 0s or all 1s or etc.). Step s304 comprises using the first request message to generate an authentication token.

FIG. 5 shows a process 350 for generating an authentication token according to some embodiments. The process 300 may be performed by a UE or a network node/network device (e.g. a radio base station) of an access network. The process 350 may begin with step s352. Step s352 comprises obtaining (e.g., generating, receiving, retrieving) a first request message that comprises: i) a first field containing a first value (e.g., reestablishment cause field containing a cause value and ii) a second field containing a second value (e.g., a field containing an identity value), but the first request message does not include any token field (e.g., a shortMAC-I field). Step s354 comprises using the first request message to generate an authentication token.

FIG. 6 shows a process 380 for generating an authentication token according to some embodiments. The process 300 may be performed by a UE or a network node/network device (e.g. a radio base station) of an access network. The process 380 may begin with step s382. Step s382 comprises obtaining (e.g., generating, receiving, retrieving): i) a cause value and ii) an identity value. Step s384 comprises using the obtained values to generate a first authentication token.

In some embodiments, the method further comprises generating a request message that comprises: i) a cause field that contains the cause value, ii) an identity field containing the identity value, and iii) a token field containing the first authentication token; and transmitting the request message to a network node of an access network.

In some embodiments, the method further comprises prior to obtaining the cause value and the identity value, receiving a message transmitted by a network node/network device (e.g., target gNB) and comprising a request message that was transmitted by a user equipment, UE. The request message comprises: i) a reestablishment cause field that contains the cause value, ii) an identity field containing the identity value, and iii) a token field that contains a second authentication token, and the step of obtaining the cause value and the identity value comprises obtaining the values from the received request message.

In some embodiments, the method further comprises determining whether the first authentication token is identical to the second authentication token.

FIG. 7 shows a process 400 performed by a UE or a network node/network device (e.g., a radio base station) of an access network according to some embodiments. The process 400 may begin with step s402. Step s402 comprises obtaining (e.g., generating, receiving, retrieving) a first request message that comprises: i) a first field containing a first value (e.g., reestablishment cause field containing a cause value, ii) a second field containing a second value (e.g., a field containing an identity value), and iii) a token field having a first type (e.g., "NULL" type). Step s404 comprises using the first request message to generate an authentication token.

In some embodiments, the first request message is encoded according to an Unaligned Packed Encoding Rule (UPER).

In some embodiments, the method is performed by a user equipment, UE.

In some embodiments, the method further comprises the UE generating a second request message that comprises: i) a first field that contains the first value, ii) a second field containing the second value, and iii) a token field containing the generated authentication token; and transmitting the second request message to a network node of an access network.

In some embodiments, the method is performed by a first network node (e.g., network device of an access network such as, for example, a gNB or an eNB).

In some embodiments, the method further comprises receiving a message transmitted by a second network node/network device (e.g., target gNB) and comprising a second request message that was transmitted by a user equipment, UE. The second request message comprises: i) a first field that contains the first value, ii) a second field containing the second value, and iii) a token field that contains an authentication token. The method further comprises obtaining the first request comprises generating the first request message using the received second request message.

In some embodiments, generating the first request message using the second request message comprises: i) modifying the second request message (e.g., replacing the value contained in the shortMAC-I filed with a pre-defined value, removing the field, replacing with different type, etc.) or ii) using information contained within the second request message to generate the first request message (e.g., using at least the cause value and identity value, but not the authentication token, from the second message to generate the first message).

In some embodiments, the method further comprises the first network node/network device determining whether the generated authorization token is identical to the received authorization token (i.e., the token included in the second request message that was transmitted by the UE).

In some embodiments, obtaining the first request message comprises the first network node/network device receiving a message transmitted by a second network node/network device (e.g., target gNB), wherein the message transmitted by the second network node/network device comprises the first request and an authentication token.

In some embodiments, the method further comprises the first network node/network device determining whether the generated authorization token is identical to the received authorization token (i.e., the token included in the message transmitted by the second network node/network device).

In some embodiments, the method further comprises as a result of determining that the generated authorization token is identical to the received authorization token, the first network node/network device transmitting to the second network node/network device a message for triggering the second network node/network device to transmit an RRC message to the UE (e.g., RRC Reestablishment message, RRC release message, etc.).

In some embodiments, the message sent to the second network node/network device comprises a UE context for the UE.

In some embodiments, using the first request message to generate the authentication token comprises: i) generating a data structure (e.g., VarShortMAC-Input) comprising the request message; ii) encoding the data structure to produce an encoded data structure (e.g., producing an ASN.1 encoded data structure); and iii) using the encoded data structure to generate the authentication token.

FIG. 8 shows a process 450 for generating an authentication token according to some embodiments. The process 450 may be performed by a network node/network device (e.g. a radio base station) of an access network. The process 450 may begin with step s452. Step s452 comprises transmitting (s452) information to a user equipment, UE, wherein i) the information indicates that the network node supports using a first method for generating an authentication token for authenticating a request message and/or ii) the information instructs the UE to use the first method to generate the authentication token for authenticating a request message.

FIG. 94C shows a process 480 performed by a user equipment, UE, according to some embodiments. The process 480 may begin with step s482. Step s482 comprises receiving information transmitted by a network node of an access network, wherein i) the information indicates that the network node supports using a first method for generating an authentication token for authenticating a request message and/or ii) the information instructs the UE to use the first method to generate the authentication token for authenticating a request message.

In some embodiments, the information is included in a Medium Access Control (MAC) Control Element (MAC CE) or Downlink Control Information (DCI).

FIG. 10 shows a process 500 performed by a user equipment, UE, according to some embodiments. The process 500 may begin with step s502. Step s502 comprises generating a message that indicates whether or not the UE supports using a first method for generating an authentication token for authenticating a request message. Step s504 comprises transmitting the message to a core network node.

FIG. 11 shows a process 550 performed by a core network node/core network device according to some embodiments. The process 550 may begin with step s552. Step s552 comprise receiving a first message, wherein the first message was transmitted by a user equipment, UE, and wherein the first message indicates whether or not the UE supports using a first method for generating an authentication token for authenticating a request message. Step s554 comprises after receiving the first message, transmitting a second message to a network node of an access network, wherein the second message indicates whether or not the UE supports using the first method for generating the authentication token.

FIG. 12 shows a process 580 performed by a core network node/core network device (e.g., a radio base station) according to some embodiments. The process 580 may begin with step s582. Step s582 comprises receiving a message transmitted by a core network node, wherein the message identifies a user equipment, UE, and indicates whether or not the identified UE supports using a first method for generating an authentication token for authenticating a request message. Step s584 comprises after receiving the message, determining, based on the message received from the core network node, whether to use the first method or a second method to generate an authentication token for use in authenticating a request transmitted by the identified UE.

FIG. 13 shows a process 600 performed by a target network node/network device. The process 600 may begin with step s602. Step s602 comprises transmitting to a source network node/network device a message comprising: i) a first request message that the target received from a user equipment or ii) a second request message that the target generated based on the first request message.

In some embodiments, the method further comprises the target obtaining an authentication token form the first request message and including the authentication token in the message transmitted to the source network node/network device.

FIG. 14 shows a process 650 performed by a first network node/network device (e.g. a radio base station) of an access network (e.g., a 3GPP radio access network). The process 650 comprises generating a first authentication token using a first value (s652); and transmitting to a second network node/network device a message comprising the first authentication token (s654).

In some embodiments, the method further comprises generating a second authentication token using a second value, and the message comprises the second authentication token.

In some embodiments, the first value is a default value assigned to two or more failure types, the method further comprises receiving a second message, and the second message comprises a second value that indicates one failure type among said two or more failure types.

In some embodiments, the message indicates that the first authentication token is associated with the first value, and the message indicates that the second authentication token is associated with the second value.

In some embodiments, the message comprises a first tuple (a.k.a., duad or dyad) that comprises i) the first authentication token and ii) the first value or a first index mapped to the first value, and the message comprises a second tuple that comprises i) the second authentication token and ii) the second value or a second index mapped to the second value.

In some embodiments, the first value is a cause value indicating a failure type, and the second value is one of a temporary identity value (e.g. RNTI-value) or a physical cell identifier (e.g. PhysCellId value).

In some embodiments, the cause value is one of the following values: reconfigurationFailure, handoverFailure, or otherFailure.

In some embodiments, the method further comprises generating a third authentication token using a third value, wherein the message transmitted to the second network node further comprises the third authentication token.

In some embodiments, the method further comprises generating a fourth authentication token using a fourth value, wherein the message transmitted to the second network node further comprises the fourth authentication token.

In some embodiments, the method further comprises obtaining historical information indicating: i) a number of times the first cause value has been observed, ii) a number of times the second cause value has been observed, and iii) a number of times the third cause value has been observed; and prior to generating the first and second authentication token, selecting the first and second cause values from a set of cause values that comprises: the first cause value, the second cause value, and a third cause value, wherein the selection is based on the historical information.

In some embodiments, the method further comprises prior to generating the first and second authentication token, selecting the first and second cause values from a set of cause values that comprises: the first cause value, the second cause value, and a third cause value, wherein the selection is based on a policy or a configuration.

In some embodiments, the method further comprises generating a third authentication token using the first value; generating a fourth authentication token using the second value; and transmitting to the second network node/network device a second message comprising the third and fourth authentication tokens, wherein the first and second authentication tokens are for a first target cell served by the network node/device, and the third and fourth authentication tokens are for a second target cell served by the network node/device.

FIG. 15 shows a process 680 performed by a first network node/network device (e.g. a radio base station) of an access network. The process 680 comprises step s682. The step s682 comprises receiving a message transmitted by a second network node/network device, the message comprising a first authentication token generated by the second network node using a first value.

In some embodiments, the message further comprises a second authentication token generated by the second network node using a second value.

In some embodiments, the first value is a default value assigned to two or more failure types, the method further comprises receiving a second message (e.g., RLF report) transmitted by a user equipment (UE), and the second message comprises a second value that indicates one failure type among said two or more failure types.

In some embodiments, the message indicates that the first authentication token is associated with the first value, and the message indicates that the second authentication token is associated with the second value.

In some embodiments, the message comprises a first tuple (a.k.a., duad or dyad) that comprises i) the first authentication token and ii) the first value or a first index mapped to the first value, and the message comprises a second tuple that comprises i) the second authentication token and ii) the second value or a second index mapped to the second value.

In some embodiments, the first value is a cause value indicating a failure type, and the second value is one of a temporary identity value (e.g. RNTI-value) or a physical cell identifier (e.g. PhysCellId value).

In some embodiments, the cause value is one of the following values: reconfigurationFailure, handoverFailure, or otherFailure.

In some embodiments, the message further comprises a third authentication token generated by the second network node using a third value.

In some embodiments, the message further comprises a fourth authentication token generated by the second network node using a fourth value.

In some embodiments, the method further comprises: receiving a request message (e.g., RRC connection reestablishment request/connection resume message) transmitted by a user equipment, the request message comprising a value and an authentication token; and i) as a result of determining that the value included in the request message is equal to the first value, determining whether the authentication token included in the request message is equal to the first authentication token, ii) as a result of determining that the value included in the request message is equal to the second value, determining whether the authentication token included in the request message is equal to the second authentication token, or iii) as a result of determining that the value included in the request message is not equal to either the first value or the second value, transmitting to the second network node a message comprising the received request message.

Figure 16:
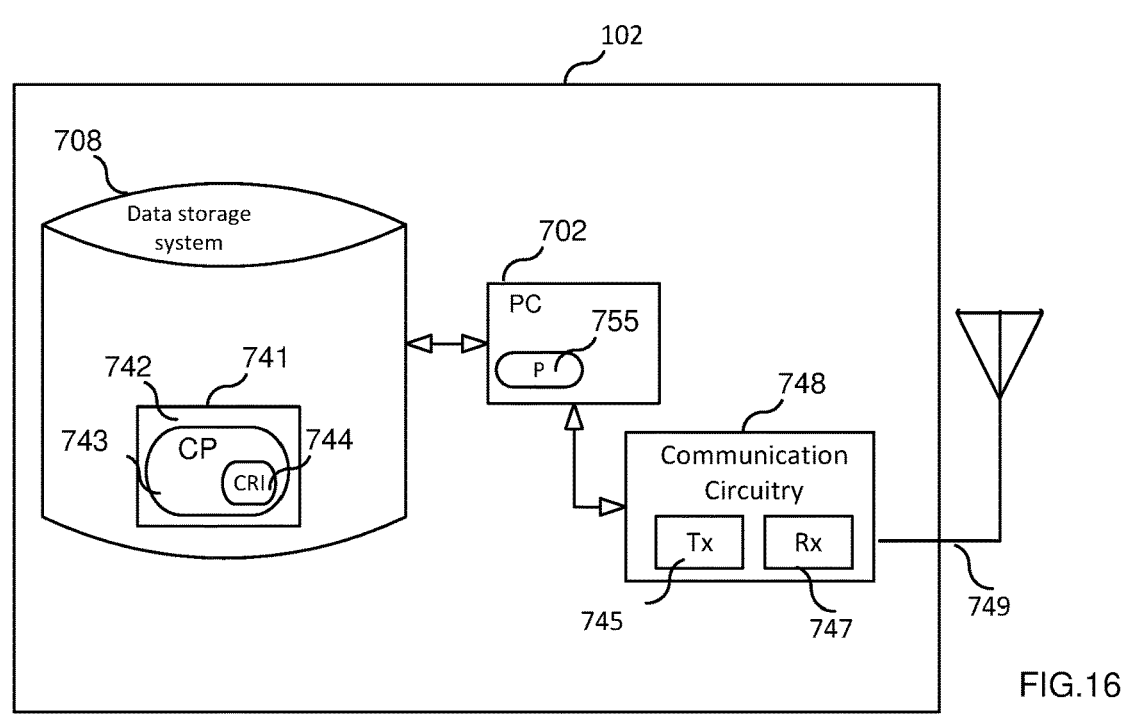
FIG. 16 is a block diagram of a UE according to some embodiments.

FIG. 16 is a block diagram of UE 102, according to some embodiments. As shown in FIG. 16, UE 102 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like); communication circuitry 748, which is coupled to an antenna arrangement 749 comprising one or more antennas and which comprises a transmitter (Tx) 745 and a receiver (Rx) 747 for enabling UE 102 to transmit data and receive data (e.g., wirelessly transmit/receive data); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes UE 102 to perform steps described herein (e.g., steps described herein with reference to the flow charts). In other embodiments, UE 102 may be configured to perform steps described herein without the need for code. That is, for example, PC 702 may consist merely of one or more ASICs. Hence, the features of the embodiments described herein may be implemented in hardware and/or software.

Figure 17:
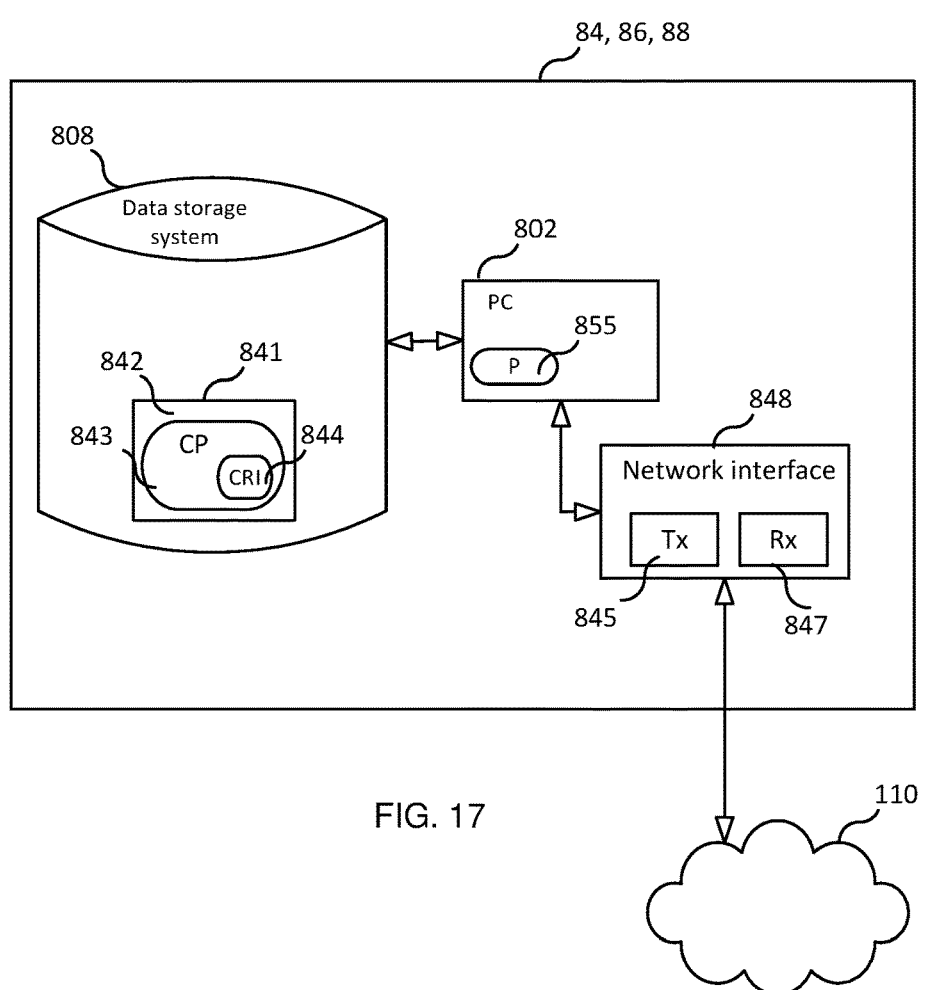
FIG. 17 is a block diagram of a network node according to some embodiments.

FIG. 17 is a block diagram of a network node (e.g., any one of network nodes 104, 106, or 108) according to some embodiments. As shown in FIG. 17, the network node 104, 106, or 108 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., the network node may be a distributed computing apparatus); at least one network interface 848 comprising a transmitter (Tx) 845 and a receiver (Rx) 847 for enabling the network node to transmit data to and receive data from other nodes connected to a network 110 (e.g., an Internet Protocol (IP) network) to which network interface 848 is connected (directly or indirectly) (e.g., network interface 848 may be wirelessly connected to the network 110, in which case network interface 848 is connected to an antenna arrangement); and a storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes the network node to perform steps described herein (e.g., steps described herein with reference to one or more of the flow charts). In other embodiments, the network node may be configured to perform steps described herein without the need for code. That is, for example, PC 802 may consist merely of one or more ASICs. Hence, the features of the embodiments described herein may be implemented in hardware and/or software.

Summary of Various Embodiments

A1. A method (300) (see FIG. 4) for generating an authentication token, the method comprising:
  obtaining (e.g., generating, receiving, retrieving) (s302) a first request message (e.g., a connection Reestablishment request message or a connection Resume request message) that comprises: i) a first field containing a first value (e.g., reestablishment cause field containing a cause value, ii) a second field containing a second value (e.g., a field containing an identity value), and iii) a third field (e.g., a token field such as shortMAC-I field) containing a pre-defined token value (e.g., all 0s or all 1s or etc.); and
  using (s304) the first request message to generate an authentication token.

A2a. A method (350) (see FIG. 5) for generating an authentication token, the method comprising:
  obtaining (e.g., generating, receiving, retrieving) (s352) a first request message that comprises: i) a first field containing a first value (e.g., reestablishment cause field containing a cause value and ii) a second field containing a second value (e.g., a field containing an identity value), but the first request message does not include any token field (e.g., a shortMAC-I field); and
  using (s354) the first request message to generate an authentication token.

A2b. A method (380) (see FIG. 6) for generating an authentication token, the method comprising:
obtaining (e.g., generating, receiving, retrieving) (s382): i) a cause value and ii) an identity value; and
using (s384) the obtained values to generate a first authentication token.

A2c. The method of embodiment A2b, further comprising:
generating a request message that comprises: i) a cause field that contains the cause value, ii) an identity field containing the identity value, and iii) a token field containing the first authentication token; and
transmitting the request message to a network node of an access network.

A2d. The method of embodiment A2b, further comprising:
prior to obtaining the cause value and the identity value, receiving a message transmitted by a network node/network device (e.g., target gNB) and comprising a request message that was transmitted by a user equipment, UE, wherein
the request message comprises: i) a reestablishment cause field that contains the cause value, ii) an identity field containing the identity value, and iii) a token field that contains a second authentication token, and
the step of obtaining the cause value and the identity value comprises obtaining the values from the received request message.

A2e. The method of embodiment A2d, further comprising determining whether the first authentication toke is identical to the second authentication token.

A3. A method (400) (see FIG. 7) for generating an authentication token, the method comprising:
obtaining (e.g., generating, receiving, retrieving) (s402) a first request message that comprises: i) a first field containing a first value (e.g., reestablishment cause field containing a cause value, ii) a second field containing a second value (e.g., a field containing an identity value), and iii) a token field having a first type (e.g., "NULL" type);
using (s404) the first request message to generate an authentication token.

A4. The method of any one of the previous embodiments, wherein the first request message is encoded according to an Unaligned Packed Encoding Rule (UPER).

A5. The method of any one of the previous embodiments, wherein the method is performed by a user equipment, UE.

A6. The method of embodiment A5, further comprising:
the UE generating a second request message that comprises: i) a first field that contains the first value, ii) a second field containing the second value, and iii) a token field containing the generated authentication token; and
transmitting the second request message to a network node of an access network.

A7. The method of any one of embodiments A1-A4, wherein the method is performed by a first network node (e.g., network device of an access network such as, for example, a gNB or an eNB).

A8. The method of embodiment A7, further comprising receiving a message transmitted by a second network node/network device (e.g., target gNB) and comprising a second request message that was transmitted by a user equipment, UE, wherein

32 the second request message comprises: i) a first field that contains the first value, ii) a second field containing the second value, and iii) a token field that contains an authentication token, and
obtaining the first request comprises generating the first request message using the received second request message.

A8.1 The method of embodiment A8, wherein generating the first request message using the second request message comprises: i) modifying the second request message (e.g., replacing the value contained in the shortMAC-I filed with a pre-defined value, removing the field, replacing with different type, etc.) or ii) using information contained within the second request message to generate the first request message (e.g., using at least the cause value and identity value, but not the authentication token, from the second message to generate the first message).

A9. The method of embodiment A8 or A8.1, further comprising:
the first network node/network device determining whether the generated authorization token is identical to the received authorization token (i.e., the token included in the second request message that was transmitted by the UE).

A9.1 The method of embodiment A7, wherein obtaining the first request message comprises the first network node/network device receiving a message transmitted by a second network node/network device (e.g., target gNB), wherein the message transmitted by the second network node/network device comprises the first request and an authentication token.

A9.2 The method of embodiment A9.1, further comprising the first network node/network device determining whether the generated authorization token is identical to the received authorization token (i.e., the token included in the message transmitted by the second network node/network device).

A10. The method of embodiment A9 or A9.2, further comprising:
as a result of determining that the generated authorization token is identical to the received authorization token, the first network node/network device transmitting to the second network node/network device a message for triggering the second network node/network device to transmit an RRC message to the UE (e.g., RRC Reestablishment message, RRC release message, etc.).

A11. The method of embodiment A10, wherein the message sent to the second network node/network device comprises a UE context for the UE.

A12. The method of any of the previous embodiments, wherein using the first request message to generate the authentication token comprises:
i) generating a data structure (e.g., VarShortMAC-Input) comprising the request message;
ii) encoding the data structure to produce an encoded data structure (e.g., producing an ASN.1 encoded data structure); and
iii) using the encoded data structure to generate the authentication token.

B3.1. A method (450) (see FIG. 8) performed by network node/network device, e.g. a radio base station, of an access network, the method comprising:
transmitting (s452) information to a user equipment, UE, wherein i) the information indicates that the network node supports using a first method for generating an authentication token for authenticating a request message and/or ii) the information instructs the UE to use the first method to generate the authentication token for authenticating a request message.

B3.2. A method (480) (see FIG. 9) performed by a user equipment, UE, the method comprising:

receiving (s482) information transmitted by a network node of an access network, wherein i) the information indicates that the network node supports using a first method for generating an authentication token for authenticating a request message and/or ii) the information instructs the UE to use the first method to generate the authentication token for authenticating a request message.

B3.3. The method of embodiment B3.1 or B3.2, wherein the information is included in a Medium Access Control (MAC) Control Element (MAC CE) or Downlink Control Information (DCI).

B4.1. A method (500) (see FIG. 10) performed by a user equipment, UE, the method comprising:

generating (s502) a message that indicates whether or not the UE supports using a first method for generating an authentication token for authenticating a request message; and transmitting (s504) the message to a core network node.

B4.2. A method (550) (see FIG. 11) performed by a core network node/core network device, the method comprising:

receiving (s552) a first message, wherein the first message was transmitted by a user equipment, UE, and wherein the first message indicates whether or not the UE supports using a first method for generating an authentication token for authenticating a request message; and after receiving the first message, transmitting (s554) a second message to a network node of an access network, wherein the second message indicates whether or not the UE supports using the first method for generating the authentication token.

B4.3. A method (580) (see FIG. 12) performed by a network node/network device, e.g. a radio base station, of an access network, the method comprising:

receiving (s582) a message transmitted by a core network node, wherein the message identifies a user equipment, UE, and indicates whether or not the identified UE supports using a first method for generating an authentication token for authenticating a request message; and after receiving the message, determining (s584), based on the message received from the core network node, whether to use the first method or a second method to generate an authentication token for use in authenticating a request transmitted by the identified UE.

C1. A method (600) (see FIG. 13) performed by a target network node/network device, the method comprising:

transmitting (s602) to a source network node/network device a message comprising: i) a first request message that the target received from a user equipment or ii) a second request message that the target generated based on the first request message.

C2. The method of embodiment C1, further comprising the target obtaining an authentication token form the first request message and including the authentication token in the message transmitted to the source network node/network device.

D1. A method (650) (see FIG. 14) performed by a first network node/network device (e.g. a radio base station) of an access network (e.g., a 3GPP radio access network), the method comprising:

generating (s652) a first authentication token using a first value; and transmitting (s654) to a second network node/network device a message comprising the first authentication token.

D1.1. The method of embodiment D1, wherein the method further comprises generating a second authentication token using a second value, and the message comprises the second authentication token.

D.1.1.1. The method of embodiment D1, wherein the first value is a default value assigned to two or more failure types, the method further comprises receiving a second message, and the second message comprises a second value that indicates one failure type among said two or more failure types.

D1.2. The method of embodiment D1.1, wherein the message indicates that the first authentication token is associated with the first value, and the message indicates that the second authentication token is associated with the second value.

D1.3. The method of embodiment D1.2, wherein the message comprises a first tuple (a.k.a., duad or dyad) that comprises i) the first authentication token and ii) the first value or a first index mapped to the first value, and the message comprises a second tuple that comprises i) the second authentication token and ii) the second value or a second index mapped to the second value.

D1.4 The method of any one of one of embodiments D1.1-D1.3, wherein the first value is a cause value indicating a failure type, and the second value is one of a temporary identity value (e.g. RNTI-value) or a physical cell identifier (e.g. PhysCellId value).

D1.5 The method of embodiment D1.4, wherein the cause value is one of the following values: reconfigurationFailure, handoverFailure, or otherFailure.

D1.6. The method of any one of embodiment D1.1-D1.5, further comprising generating a third authentication token using a third value, wherein the message transmitted to the second network node further comprises the third authentication token.

D1.7. The method of embodiment D1.6, further comprising generating a fourth authentication token using a fourth value, wherein the message transmitted to the second network node further comprises the fourth authentication token.

D1.8. The method of any one of embodiment D1.1-D1.5, further comprising:

obtaining historical information indicating: i) a number of times the first cause value has been observed, ii) a number of times the second cause value has been observed, and iii) a number of times the third cause value has been observed; and prior to generating the first and second authentication token, selecting the first and second cause values from a set of cause values that comprises: the first cause value, the second cause value, and a third cause value, wherein the selection is based on the historical information.

D1.9. The method of any one of embodiment D1.1-D1.5, further comprising:

prior to generating the first and second authentication token, selecting the first and second cause values from a set of cause values that comprises: the first cause value, the second cause value, and a third cause value, wherein the selection is based on a policy or a configuration.

D1.10. The method of any one of claims D1.1-D1.5, D1.8, or D1.9, further comprising:

generating a third authentication token using the first value;

generating a fourth authentication token using the second value; and transmitting to the second network node/network device a second message comprising the third and fourth authentication tokens, wherein the first and second authentication tokens a for a first target cell served by the network node/device, and the third and fourth authentication tokens a for a second target cell served by the network node/device.

D3. A method (680) (see FIG. 15) performed by a first network node/network device (e.g. a radio base station) of an access network, the method comprising:

receiving (s682) a message transmitted by a second network node/network device, the message comprising a first authentication token generated by the second network node using a first value.

D.3.1. The method of embodiment D3, wherein the message further comprises a second authentication token generated by the second network node using a second value.

D.3.1.1. The method of embodiment D3, wherein the first value is a default value assigned to two or more failure types, the method further comprises receiving a second message (e.g., RLF report) transmitted by a user equipment (UE), and the second message comprises a second value that indicates one failure type among said two or more failure types.

D3.2. The method of embodiment D3.1, wherein the message indicates that the first authentication token is associated with the first value, and the message indicates that the second authentication token is associated with the second value.

D3.3. The method of embodiment D3.2, wherein the message comprises a first tuple (a.k.a., duad or dyad) that comprises i) the first authentication token and ii) the first value or a first index mapped to the first value, and the message comprises a second tuple that comprises i) the second authentication token and ii) the second value or a second index mapped to the second value.

D3.4 The method of any one of one of embodiments D3.1-D3.3, wherein the first value is a cause value indicating a failure type, and the second value is one of a temporary identity value (e.g. RNTI-value) or a physical cell identifier (e.g. PhysCel-lId value).

D3.5 The method of embodiment D3.4, wherein the cause value is one of the following values: reconfigurationFailure, handoverFailure, or otherFailure.

D3.6. The method of any one of embodiments D3.1-D3.5, wherein the message further comprises a third authentication token generated by the second network node using a third value.

D3.7. The method of embodiment D3.6, wherein the message further comprises a fourth authentication token generated by the second network node using a fourth value.

D3.8. The method of embodiment D3.1, further comprising:

receiving a request message (e.g., RRC connection reestablishment request/connection resume message) transmitted by a user equipment, the request message comprising a value and an authentication token; and i) as a result of determining that the value included in the request message is equal to the first value, determining whether the authentication token included in the request message is equal to the first authentication token, ii) as a result of determining that the value included in the request message is equal to the second value, determining whether the authentication token included in the request message is equal to the second authentication token, or iii) as a result of determining that the value included in the request message is not equal to either the first value or the second value, transmitting to the second network node a message comprising the received request message.

E1.1. A computer program (743) comprising instructions (744) which when executed by processing circuitry (702) of a user equipment, UE (102), causes the UE to perform the method of any one of the above UE embodiments (e.g., A1, A2, A3, B4.1, B3.2).

E1.2. A computer program (843) comprising instructions (844) which when executed by processing circuitry (802) of a network node (104, 106, 108), causes the network node to perform the method of any one of the above network node embodiments (e.g., A1, A2, A3 C1, C4, B4.2, B4.3, B3.1).

E2. A carrier containing the computer program of embodiment D1.1 or D1.2, wherein the carrier is one of an electronic signal, an optical signal, a radio signal, and a computer readable storage medium (742, 842).

F1. A UE (102), the UE being configured to perform the method of any one of the above UE embodiments (e.g., A1, A2, A3, B4.1, B3.2).

G1. A user equipment, UE (102), the UE comprising:

memory (742); and processing circuitry (702), wherein the UE is configured to perform the method of any one of the UE embodiments (e.g., A1, A2, A3, B4.1, B3.2).

H1. A network node (104, 106, 108), the network node being configured to perform the method of any one of the network node embodiments (e.g., A1, C1, C4, B4.2, B4.3, B3.1).

I1. A network node (104, 106, 108), the network node comprising:

memory (842); and processing circuitry (802), wherein the network node is configured to perform the method of any one of the network node embodiments (e.g., A1, C1, C4, B4.2, B4.3, B3.1).

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for generating an authentication token, the method comprising:
obtaining a first request message that comprises:
i) a first value, and
ii) a second value; and
using the first request message to generate an authentication token, wherein
using the first request message to generate the authentication token comprises:
generating a data structure comprising the request message;
encoding the data structure to produce an encoded data structure; and
using the encoded data structure to generate the authentication token.

2. The method of claim 1, wherein the first request message is encoded according to an Unaligned Packed Encoding Rule.

3. The method of claim 1, wherein
the method is performed by a user equipment (UE), and
the method further comprises:
the UE generating a second request message that comprises: i) a first field that contains the first value, ii) a second field containing the second value, and iii) a token field containing the generated authentication token; and
the UE transmitting the second request message to a network node of an access network.

4. The method of claim 1, wherein the method is performed by a first network node.

5. The method of claim 4, wherein
the method further comprises receiving a message transmitted by a second network node/network device and comprising a second request message that was transmitted by a user equipment (UE),
the second request message comprises:
i) a first field that contains the first value,
ii) a second field containing the second value, and
iii) a token field that contains an authentication token, and
obtaining the first request comprises generating the first request message using the received second request message.

6. The method of claim 5, wherein generating the first request message using the second request message comprises: i) modifying the second request message or ii) using information contained within the second request message to generate the first request message.

7. The method of claim 5, further comprising:
the first network node/network device determining whether the generated authorization token is identical to the received authorization token.

8. The method of claim 7, further comprising:
as a result of determining that the generated authorization token is identical to the received authorization token, the first network node/network device transmitting to the second network node/network device a message for triggering the second network node/network device to transmit an RRC message to the UE.

9. The method of claim 8, wherein the message sent to the second network node/network device comprises a UE context for the UE.

10. The method of claim 5, wherein obtaining the first request message comprises the first network node/network device receiving a message transmitted by a second network node/network device, wherein the message transmitted by the second network node/network device comprises the first request and an authentication token.

11. The method of claim 10, further comprising the first network node/network device determining whether the generated authorization token is identical to the received authorization token.

12. A method comprising:
a user equipment (UE) obtaining a first request message that comprises:
i) a first field containing a first value,
ii) a second field containing a second value, and
iii) a third field containing a pre-defined token value;
the UE using the first request message to generate an authentication token;
the UE generating a second request message that comprises: i) a first field that contains the first value, ii) a second field containing the second value, and iii) a token field containing the generated authentication token; and
transmitting the second request message to a network node of an access network.

13. A apparatus, the apparatus comprising:
memory; and
processing circuitry, wherein the apparatus is configured to perform a method comprising:
obtaining a first request message that comprises:
i) a first value,
ii) a second value; and using the first request message to generate an authentication token, wherein using the first request message to generate the authentication token comprises:
generating a data structure comprising the request message;
encoding the data structure to produce an encoded data structure; and
using the encoded data structure to generate the authentication token.

* * * * *